(12) United States Patent
Fuwa

(10) Patent No.: US 6,707,029 B1
(45) Date of Patent: Mar. 16, 2004

(54) OPTICAL DISPLACEMENT MEASURING APPARATUS HAVING LIGHT RECEIVING ARRAYS

(75) Inventor: Shigehiro Fuwa, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/646,709

(22) PCT Filed: Jan. 20, 2000

(86) PCT No.: PCT/JP00/00258

§ 371 (c)(1),
(2), (4) Date: Sep. 21, 2000

(87) PCT Pub. No.: WO00/43734

PCT Pub. Date: Jul. 27, 2000

(30) Foreign Application Priority Data

Jan. 22, 1999 (JP) .............................................. 11-14074

(51) Int. Cl.[7] .............................. H01J 5/16; G01D 5/34
(52) U.S. Cl. .............................. 250/237 G; 250/231.13; 250/231.14
(58) Field of Search ...................... 250/231.13–231.14, 250/231.16, 237 R, 237 G; 356/616, 677

(56) References Cited

U.S. PATENT DOCUMENTS

| 4,319,134 A | 3/1982 | Weber |
|---|---|---|
| 5,539,519 A | 7/1996 | Takagi et al. |
| 5,774,219 A | 6/1998 | Matsuura |
| 6,255,644 B1 * | 7/2001 | Taniguchi et al. ..... 250/231.13 |
| 6,313,460 B1 * | 11/2001 | Haas et al. ............. 250/231.13 |
| 6,407,378 B1 * | 6/2002 | Sakaguchi ............. 250/231.13 |

FOREIGN PATENT DOCUMENTS

| EP | 0 090 576 | 10/1983 | |
|---|---|---|---|
| JP | 57-184918 | 11/1982 | |
| JP | 62-46316 | 3/1987 | |
| JP | 62-168408 | 10/1987 | |
| JP | 5-52594 | 3/1993 | |
| JP | 5-164572 | 6/1993 | |
| JP | 2000088604 | * 3/2000 | ............ G01D/5/36 |

* cited by examiner

Primary Examiner—Georgia Epps
Assistant Examiner—Alicia M Harrington
(74) Attorney, Agent, or Firm—Finnegan, Henderson, Farabow, Garrett & Dunner, L.L.P.

(57) ABSTRACT

Optical apparatus for measuring displacement of a moveable member so as to enable compact construction and high accuracy measurement includes an optical grid, a light source, a plurality of light receiving arrays, and an operating circuit. Also, each of the plurality of light receiving arrays has a plurality of light receiving elements arranged at a pitch S. The operating circuit calculates the displacement of the moveable member based on outputs from the plurality of light receiving arrays, which are arranged so that a predetermined distance in a direction of displacement shifts one from another.

16 Claims, 24 Drawing Sheets

PRIOR ART

PRIOR ART

Fig. 24
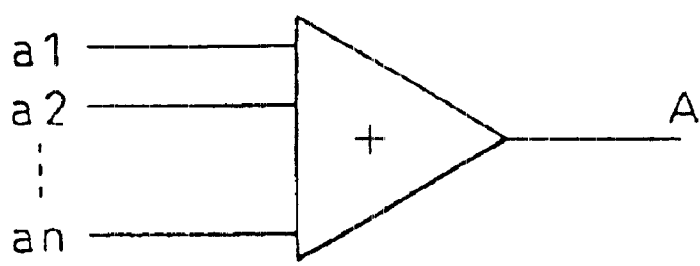
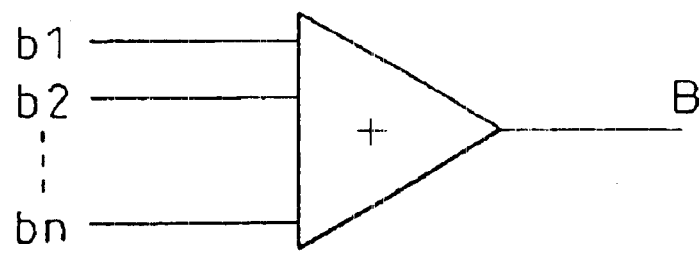
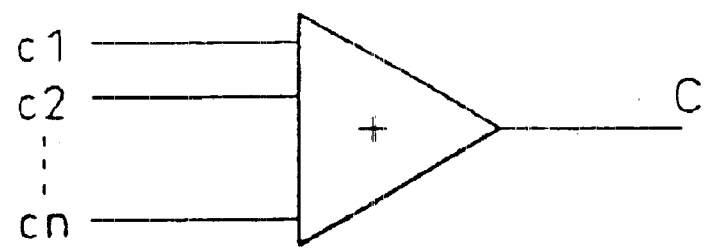
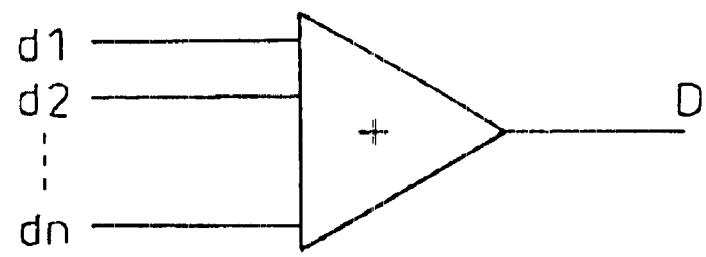

OPTICAL DISPLACEMENT MEASURING APPARATUS HAVING LIGHT RECEIVING ARRAYS

TECHNICAL FIELD

The present invention relates to a relative position measuring apparatus using an optical displacement measuring device. More particularly, the invention relates to a high accuracy relative position measuring apparatus that employs a linear optical encoder system comprising a glass scale and a light detecting sensor.

BACKGROUND ART

Laser-based measuring apparatuses using lasers and optical encoder-based measuring apparatuses using optical encoders are known in the art. The laser-based measuring apparatus can achieve high measurement accuracy as measurements are made using the laser light wavelength as the unit of measurement. The laser-based measuring apparatus is primarily used as a relative position measuring apparatus for measuring the length between two points. The optical encoder-based measuring apparatus comprises: a scale constructed from a glass plate, film, thin metal plate, or the like; an optical grid formed with a prescribed pitch on the scale; a fixed index grid disposed opposite the scale with prescribed spacing provided therebetween (the phase of the index grid is 90 degrees shifted relative to the phase of the optical grid); a fixed light source for illuminating the scale with collimated light; and a light detection sensor. When the scale moves, the optical grid and the index grid overlap each other, producing a pattern of light and dark. The light detection sensor detects this light and dark pattern. The optical encoder-based measuring apparatus is commercially implemented as a digital gauge, and is primarily used as a relative position measuring apparatus for measuring the distance between two points. Optical encoder-based measuring apparatus according to the prior art will be described below with reference to relevant drawings.

FIG. 21 is a diagram showing a first prior art. The measuring apparatus shown in FIG. 21 comprises: a glass scale 10; an optical grid 11 formed on the glass scale 10; a light source 1 for illuminating the glass scale 10 with collimated slight; index grids 51 to 54 which receive light transmitted through the glass scale 10; an index base 50 where the index grids 51 to 54 are formed; light receiving elements 61 to 64 for receiving light transmitted through the index grids 51 to 54; and a substrate 20 where the light receiving elements 61 to 64 are formed. Also a semiconductor integrated circuit (IC) 22 and terminals 21 for connecting a cable 70 are formed on the substrate 20.

The phase of the index grid 51 is shifted by 90 degrees, the phase of the index grid 52 is shifted by 180 degrees, the phase of the index grid 53 is shifted by 270 degrees, and the phase of index grid 54 is shifted by 360 degrees relative to the phase of the optical grid 11. The light receiving elements 61 to 64 are each constructed from a signal light receiving element such as a photosensor.

The above-described first prior art is constructed by combining the glass scale, index grids, and light detection sensors, and thus the provision of index grids has been indispensable. Furthermore, to achieve high accuracy measurement, the pitch of the index grids, the proportions of the transparent and opaque portions of the index grids, the distance from the glass scale to the index grids, and the distance from the index grids to the light detection sensors must be adjusted accurately.

FIG. 22 is a diagram showing second prior art. The measuring apparatus shown in FIG. 22 comprises: a glass scale 10; an optical grid 11 formed on the glass scale 10; a light source for illuminating the glass scale 10 with collimated light; a light receiving array 37 for receiving light transmitted through the glass scale 10; and a substrate 20 where the light receiving array 37 is formed. Also a semiconductor integrated circuit (IC) 23 and terminals 21 for connecting a cable 70 are formed on the substrate 20.

FIG. 23 is a diagram showing the relationship between the optical grid 11 and the light receiving array 37 in the second prior art. Reference character s designates the pitch of the optical grid 11, while reference character w denotes the width of a transparent portion of the optical grid 11 and v denotes the width of an opaque portion of the optical grid 11. Here, w and v are each set equal to s/2.

The light receiving array 37 consists of a plurality of light receiving elements. Reference character p designates the pitch of the light receiving elements, while reference character u denotes the width of a light receiving portion 35 and r denotes the width of a light insensitive portion. Here, p=3/4×s, u=s/2, and r=s/4. That is, the ratio of u to r is 2:1.

More specifically, the light receiving array 37 is arranged so that four light receiving elements, g1, g2, g3 and g4, corresponds to three optical grid elements e1, e2 and e3. Further, the light receiving array is constructed so that every fourth light receiving element receives the same amount of light.

In addition, a light receiving element a1 is arranged so that its output is shifted in phase by 90 degrees relative to the output of b1, and a light receiving element b1 is arranged so that its output is shifted in phase by 90 degrees relative to the output of c1. Likewise, c1 and d1 are arranged so that their outputs are shifted in phase by 90 degrees, respectively. In this arrangement, as shown in FIG. 24, every four light receiving elements are connected together and their outputs are summed. Here, let the sum of a1, a2, a3, ... be denoted by A, the sum of b1, b2, b3, ... denoted by B, the sum of c1, c2, c3, ... denoted by C, and the sum of d1, d2, d3, ... denoted by D. Then, the phases of A, B, C, and D are shifted by 90 degrees relative to one another. The measuring apparatus makes a measurement by processing the signals of A, B, C, and D.

As described above, in the second prior art, the size of each light receiving element has had to be restricted to 3/4×s, and complicated wiring has had to be provided to enable data to be taken from every four elements in the plurality of light receiving elements and summed together.

Another prior art is described in Japanese Unexamined Patent Publication Nos. 8-313209 and 9-33210. This prior art uses a light detection sensor (CCD) having sensor elements arranged in an array at the same pitch as the optical grid, and the light detection sensor is constructed to also serve as an index grid. In this prior art, however, since the light source is moved together with the optical grid while holding the light detection sensor stationary, the length of the light detection sensor (CCD) must be made equal to the measuring length.

Still another prior art is described in Japanese Unexamined Patent Publication 10-132612. In this prior art, light detection sensors are arranged so that they are shifted by s/4 relative to one another. This prior art, however, has the problem that the pitch of the optical grid is coarse and the resolution is low, since four light detection sensors must be arranged within one pitch of the optical grid.

It is an object of the present invention to provide a compact and high accuracy optical displacement measuring apparatus that resolves the above-outlined problems.

It is another object of the present invention to provide an optical displacement measuring apparatus that uses a plurality of light receiving arrays each having a plurality of light receiving elements arranged at the same pitch as the optical grid.

It is still another object of the present invention to provide an optical displacement measuring apparatus capable of indicating the unit of measurement (1 µm, 0.5 µm, etc) using simple configuration.

DISCLOSURE OF THE INVENTION

The present invention comprises: a moveable first member having an optical grid formed with a pitch s; a light source for illuminating the first member; a plurality of light receiving arrays, each having a plurality of light receiving elements arranged at the pitch s, for receiving light transmitted through the first member; and a computing circuit for measuring a displacement of the first member based on outputs from the plurality of light receiving arrays, and wherein the plurality of light receiving arrays are arranged so that one is shifted from another by a predetermined distance in a direction of movement of the first member.

Preferably, the optical grid includes a transparent portion and an opaque portion, and the ratio of the width of the transparent portion to the width of the opaque portion is 1:1, while each of the light receiving elements includes a light receiving portion and a light insensitive portion, and the ratio of the width of the light receiving portion to the width of the light insensitive portion is 1:1.

Further preferably, the plurality of light receiving arrays are arranged along the direction of movement of the first member, or along a direction perpendicular to the direction of movement of the first member.

More preferably, the predetermined distance is equal to s/4 or a minimum measurement unit, for example, 1 µm.

Preferably, the number of light receiving arrays is 2, 4, s, or s/2.

Further preferably, the light source emits collimated light.

In one preferred embodiment, the operating circuit includes: an intra-pitch relative position computing unit which performs a phase calculation based on the outputs from the plurality of light receiving arrays, and computes a relative position within one pitch from the phase calculation; a direction discriminating computing unit which discriminates the direction of movement of the first member based on the outputs from the plurality of light receiving arrays; a counter which counts a number of clear bands of contrast occurring due to the movement of the first member; a relative position computing unit which measures the displacement of the first member based on the result of the relative position computed by the intra-pitch relative position computing unit and on a count value supplied by the counter. Preferably, the optical displacement measuring apparatus comprises a display device for displaying the count value of the counter.

In another preferred embodiment, the computing circuit includes a converter which converts the outputs from the plurality of light receiving arrays into digital signals, a generator for generating a count signal for counting the amount of displacement of the first member based on the digital signals, and a counter which counts a leading edge or a trailing edge events of the count signal.

Preferably, an optical displacement measuring apparatus comprises a display device for displaying the count value of the counter.

More preferably, the count value of the counter corresponds a 1 µm or 0.5 µm displacement of the first member.

ADVANTAGEOUS EFFECT OF THE INVENTION

Since no index grid or the like is used, the present invention achieves an optical displacement measuring apparatus compact in size.

Furthermore, since the pitch of the light receiving elements is made the same as the pitch of the optical grid, and since the ratio of the width of the light receiving portion to the width of the light insensitive portion in each light receiving element is also made the same as the ratio of the width of the transparent portion to the width of the opaque portion in the optical grid, the invention achieves high accuracy with a simple configuration.

Moreover, in the optical displacement measuring apparatus of the invention, since provisions are made to generate a signal corresponding to a minimum measurement unit (1 µm, 0.5 µm, etc) and to display the measured result based on that signal, the measured result can be displayed using a simple and inexpensive configuration.

BRIEF DESCRIPTION OF THE DRAWINGS

FIG. 24 is a diagram showing a wiring of a light receiving element array according to the second prior art.

DETAILED DESCRIPTION OF THE INVENTION

Embodiment 1

A first embodiment of the present invention will be described below.

Figure 1:
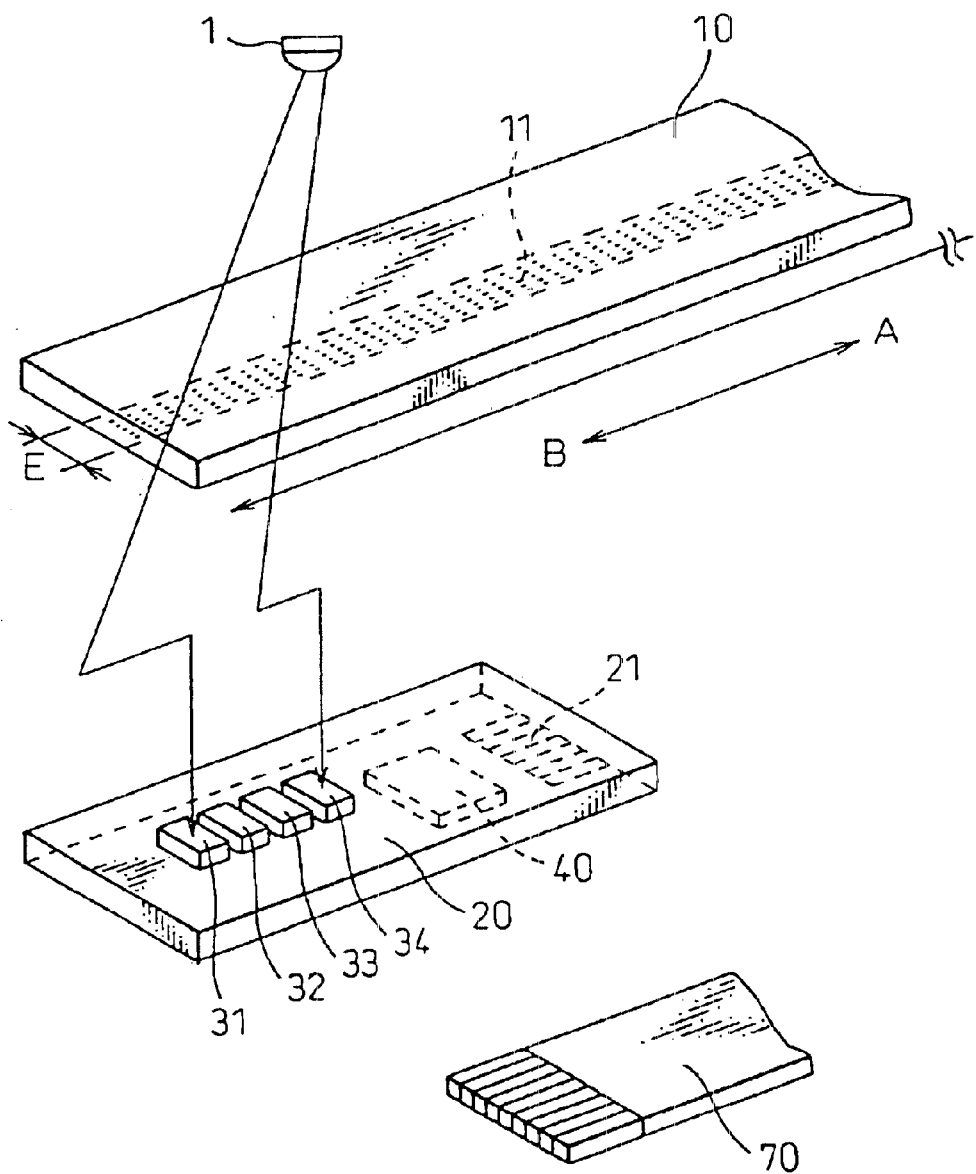
FIG. 1 is a schematic diagram showing a measuring apparatus according to a first embodiment of the present invention.

FIG. 1 is a schematic diagram showing an optical displacement measuring apparatus according to this embodiment. Reference numeral 10 is a glass scale where an optical grid 11 is formed, and 1 is a light source for illuminating the glass scale 10 with collimated light. Further, reference numerals 31 to 34 are light receiving arrays for receiving light transmitted through the glass scale 10. Reference numeral 40 is a semiconductor integrated circuit (one-chip IC) having adders 41 to 44, an intra-pitch relative position computing unit 45, a direction discriminating computing unit 46, a counter 47, and a relative position computing unit 48. Reference numeral 21 indicates terminals for connecting a cable 70. The cable 70 is used to supply power as well as to transfer signals to an external device such as a display device. The light receiving arrays 31 to 34, the semiconductor integrated circuit 40, and the terminals 21 are mounted on a substrate 20.

The glass scale 10 is mounted on a movable measuring portion of the optical displacement measuring apparatus according to the present embodiment. The optical grid 11 is formed to extend in the direction of movement, A-B, of the glass scale 10; the length L of the optical grid 11 is made a little longer than the measurable length of the measuring apparatus, while the width E of the optical grid 11 is set so that the light transmitted through the optical grid 11 covers the light receiving arrays 31 to 34. The glass scale 10 and the surface of the light receiving arrays 31 to 34, are separated by a suitable distance. Preferably, light emitted from the light source 1 is monochromatic light.

Figure 2:
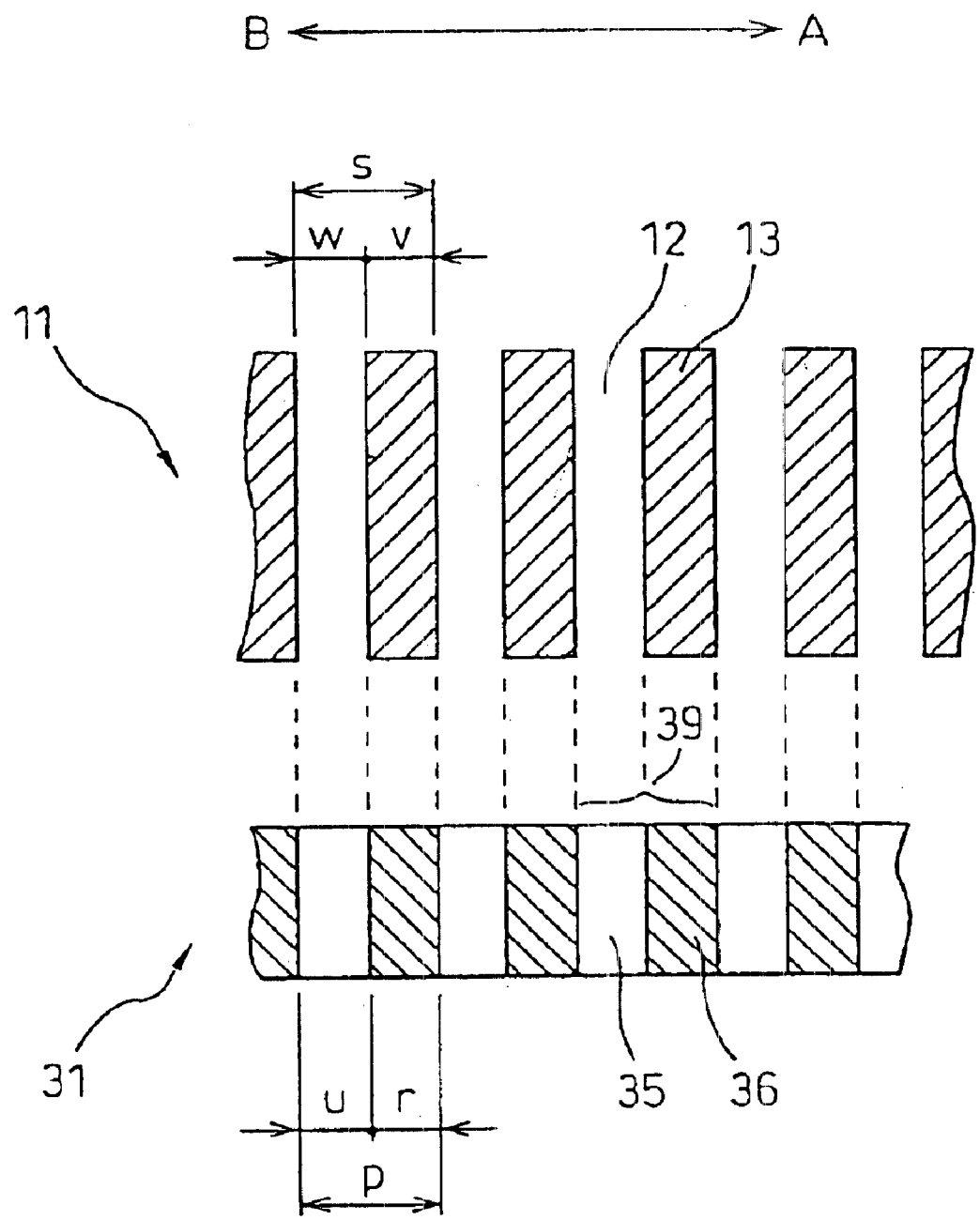
FIG. 2 is a diagram showing the relationship between an optical grid and a light receiving element array.

FIG. 2 is an enlarged view showing a portion of the optical grid 11 and a portion of the light receiving element array 31, with relative dimensions given for comparison purposes. Arrow A-B indicates the direction of movement of the glass scale. Reference character s designates the pitch of the optical grid 11, while reference character w denotes the width of a transparent portion of the optical grid 11 and v denotes the width of an opaque portion of the optical grid 11. Here, w and v are each set equal to s/2.

The light receiving array 31 consists of a plurality of light receiving elements 39. Each light receiving element 39 consists of a light receiving portion 35 where light can be received, and a light insensitive portion 36 where light cannot be received. Reference character p designates the pitch of the light receiving element 39, while reference character u denotes the width of the light receiving portion 35 and r the width of the light insensitive portion 36. Here, u and r are each set equal to s/2.

Figure 3:
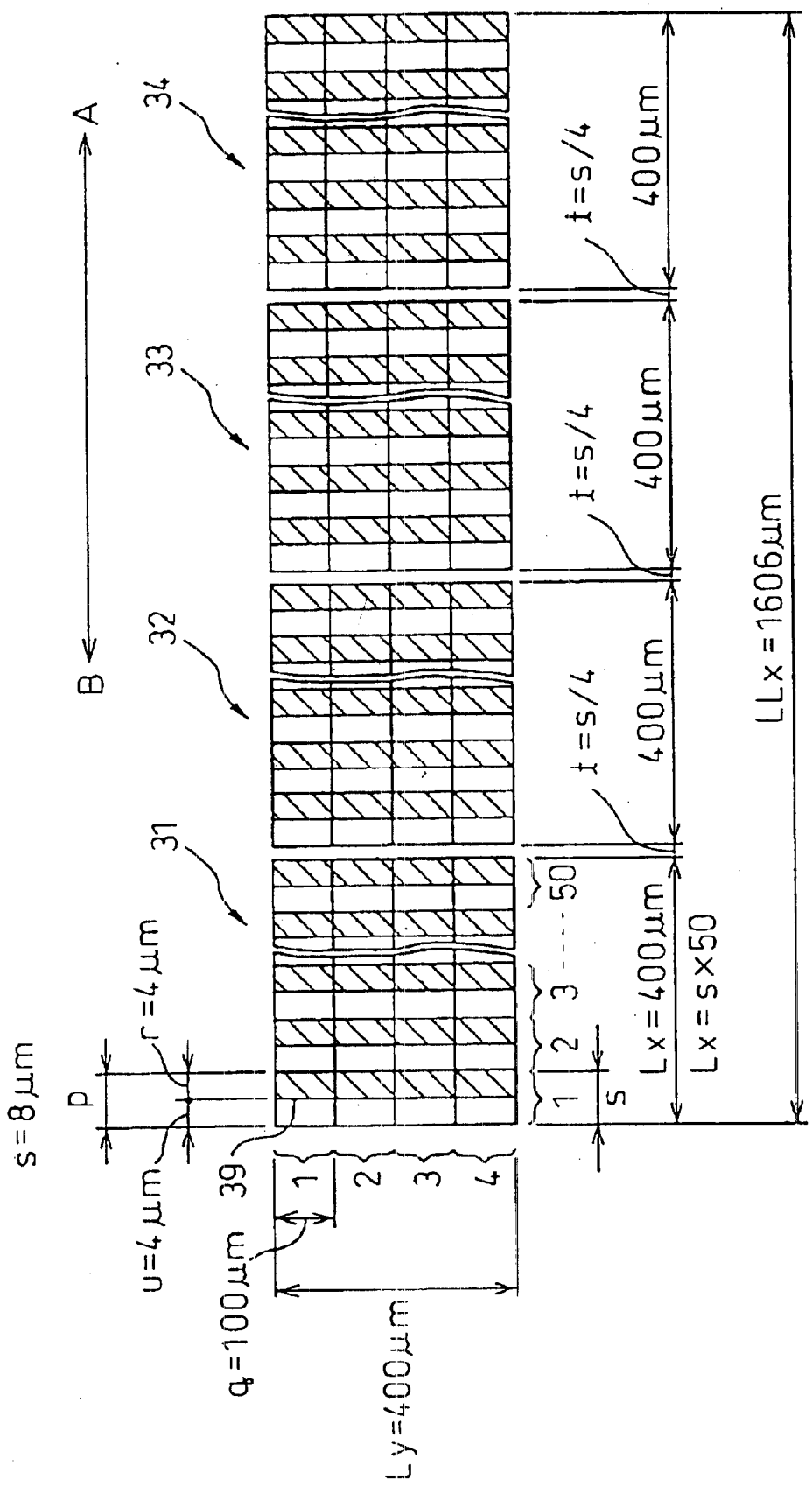
FIG. 3 is a diagram showing light receiving element arrays according to the first embodiment.

FIG. 3 is a diagram showing the details of the light receiving arrays 31 to 34. Arrow A-B indicates the direction of movement of the glass scale. The light receiving arrays 31 to 34 are arranged along the direction of movement, A-B, of the glass scale. Each light receiving array consists of fifty light receiving elements 39 horizontally (along a direction parallel to A-B) and four light receiving elements 39 vertically (along a direction perpendicular to A-B). Thus, each light receiving array is constructed from a total of two hundred light receiving elements 39.

The width, p, of each light receiving element 39 is set at 8 μm, which is the same as the pitch, s, of the optical grid 11, while u and r are each set at 4 μm. The horizontal length, Lx, of each light receiving array is, therefore, 400 μm (8×50). On the other hand, the length, q, of each light receiving element is set at 100 μm. The vertical length, Ly, of each light receiving array is, therefore, 400 μm (100×4).

The distance, t, between adjacent light receiving element arrays is set at s/4=2 μm. The horizontal length, LLx, of the light receiving arrays as a whole is, therefore, 1606 μm. Generally, the horizontal length, LLx, of the light receiving element arrays as a whole can be given as s×n×4+(s/4)×3, where s is the pitch and n is the number of light receiving elements in the horizontal direction in each light receiving element array. Accordingly, the length, L, of the optical grid 11 formed on the glass scale 10 must be set at least equal to the measuring length plus the length LLx. In the present embodiment, since the vertical length, Ly, of each light receiving element array is 400 μm, as noted above, the width, E, of the optical grid 11 formed on the glass scale 10 must be at least 400 μm.

Here, the distance, t, between adjacent light receiving arrays is set at s/4=2 μm, but instead, the distance t may be set, as necessary, at s×n (n is an integer)+s/4.

A method of computing the position of the glass scale 10 will be described below.

In the present embodiment, the pitch, s, of the optical grid 11 formed on the glass scale 11 coincides with the pitch, p, of the light receiving elements 39, and also, the ratio of the width of the transparent portion 12 to the width of the opaque portion 13 in the optical grid 11 coincides with the ratio of the width of the light receiving portion 35 to the width of the light insensitive portion 36 in each light receiving element. As a result, each light receiving element within the same light receiving array is illuminated with the same amount of light. However, since the light receiving arrays are spaced apart by the distance t which is different from the pitch of the light receiving elements, the amount of light that falls on each light receiving element varies from one light receiving array to the next.

Figure 4:
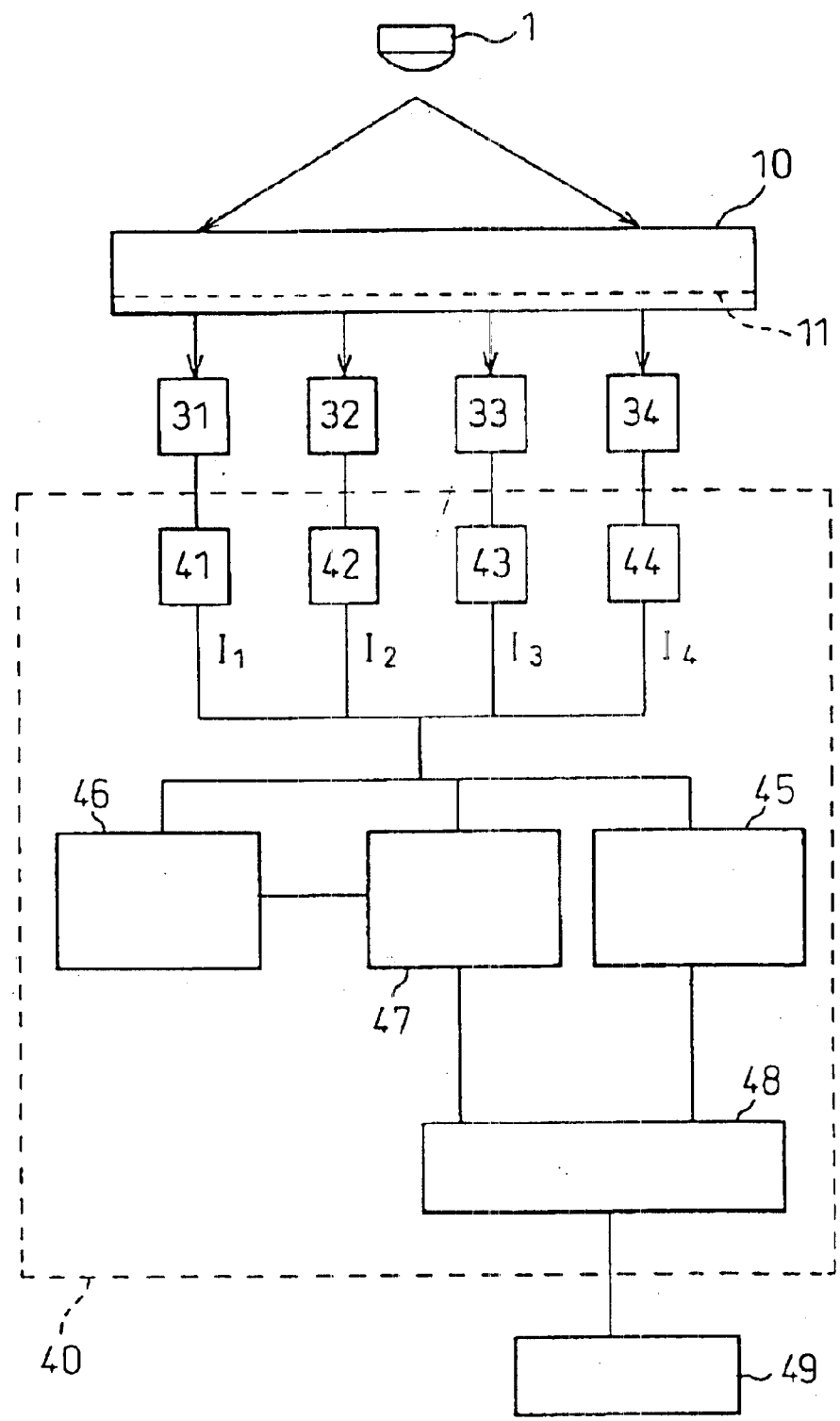
FIG. 4 is a block diagram showing a signal flow according to the first embodiment.

FIG. 4 is a block diagram illustrating a signal flow in the present embodiment. The semiconductor integrated circuit 40 includes the adders 41 to 44, intra-pitch relative position computing unit 45, direction discriminating computing unit 46, counter 47, and relative position computing unit 48. The adders 41 to 44 are connected to the respective light receiving arrays 31 to 34. Each adder adds together the outputs of all the light receiving elements in its associated light receiving array. In the present embodiment, since each light receiving array consists of two hundred light receiving elements 39, a 200-times output can be obtained. $I_1$ to $I_4$ denote the outputs of the respective adders 41 to 44. By summing the outputs from the plurality of light receiving elements, since manufacturing variations among the elements, etc. can be canceled, a highly accurate output can be obtained.

Figure 5:
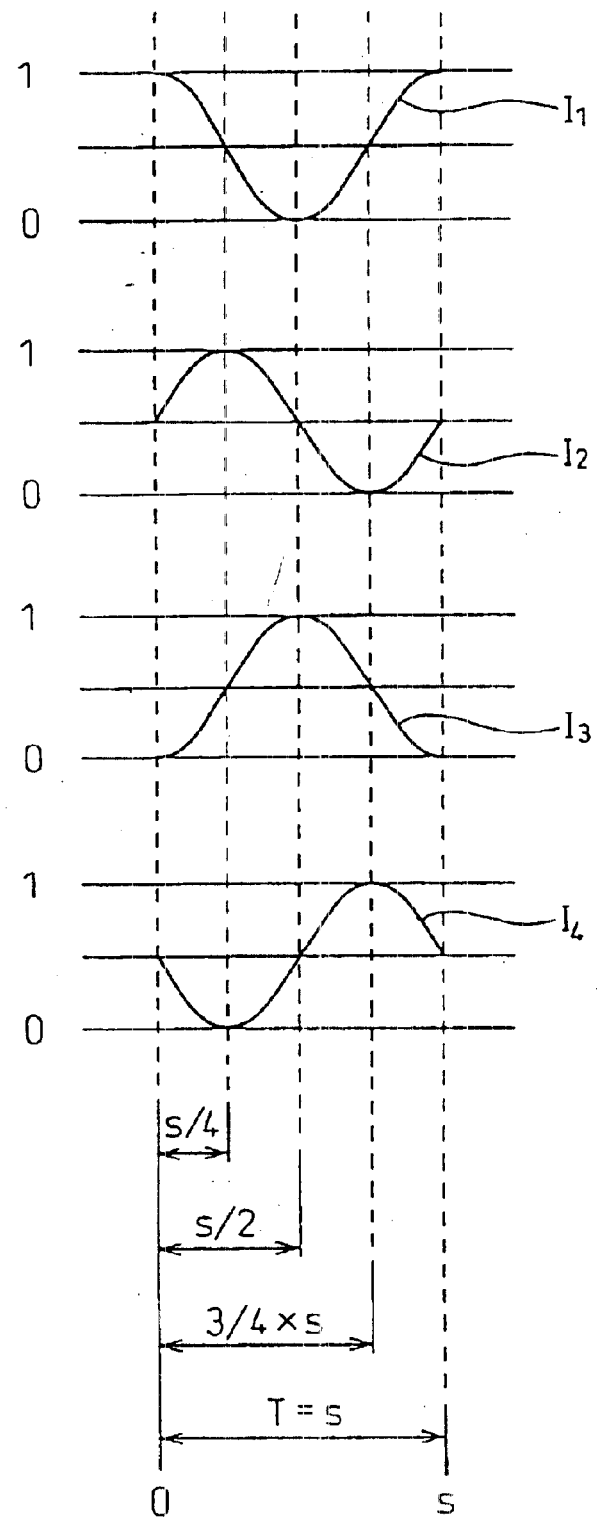
FIG. 5 is a diagram showing changes of outputs obtained from light receiving elements according to the first embodiment.

FIG. 5 illustrates how the outputs $I_1$ to $I_4$ change when the glass scale 10 is moved in the direction of arrow A in FIG. 1. First, the output $I_1$ of the light receiving array 31 will be explained. It is assumed here that the initial state of the output $I_1$ is given when the transparent portion 12 of the optical grid 11 is aligned with the light receiving portion 35 of the light receiving array 31, as shown in FIG. 2. In this initial state, the output $I_1$ takes a maximum value as shown in FIG. 5. The maximum value at this time is normalized to 1. When the glass scale 10 is moved in the direction of arrow A from the position in the initial state, the output $I_1$ gradually decreases. When the glass scale 10 has moved by s/4 (1/4 pitch), the output $I_1$ is at 1/2, and when the glass scale 10 has moved by s/2 (1/2 pitch), the output $I_1$ is at 0. The output $I_1$ is 0 when the opaque portion 13 of the optical grid 11 is aligned with the light receiving portion 35 of the light receiving array 31. When the glass scale 10 is further moved in the direction of arrow A, the output $I_1$ gradually increases. When the glass scale 10 has moved by 3/4×s (3/4 pitch), the output $I_1$ is at 1/2, and when the glass scale 10 has moved by s (1 pitch), the output $I_1$ again reaches the maximum value.

Next, the output $I_2$ of the light receiving array 32 will be explained. The light receiving array 32 is arranged so that it is shifted by s/4 with respect to the light receiving array 31. Therefore, in the initial state, the output $I_2$ is at 1/2 as shown in FIG. 5. When the glass scale 10 is moved in the direction of arrow A, the output $I_2$ gradually increases. When the glass scale 10 has moved by s/4 (1/4 pitch), the output $I_2$ reaches the maximum value. When the glass scale 10 has moved by s/2 (1/2 pitch), the output $I_2$ is at 1/2; when the glass scale 10 has moved by 3/4×s (3/4 pitch), the output $I_2$ is at 0; and when the glass scale 10 has moved by s (1 pitch), thee output $I_2$ is at 1/2. As can be seen from a comparison between the output $I_1$ and the output $I_2$, the output $I_2$ is 90 degrees shifted in phase with respect to the output $I_1$.

The light receiving array 33 is arranged so that it is shifted by 2/4×s with respect to the light receiving array 31. Therefore, in the initial state, the output $I_3$ of the light receiving array 33 is at 0 as shown in FIG. 5, and when the glass scale 10 has moved by s/2 (1/2 pitch), the output $I_3$ is at the maximum value. As can be seen from a comparison between the output $I_1$ and the output $I_3$, the output $I_3$ is 180 degrees shifted in phase with respect to the output $I_1$.

The light receiving array 34 is arranged so that it is shifted by 3/4×s with respect to the light receiving array 31. Therefore, in the initial state, the output $I_4$ of the light receiving array 34 is at 1/2 as shown in FIG. 5, and when the glass scale 10 has moved by 3/4×s (3/4 pitch), the output $I_4$ is at the maximum value. As can be seen from a comparison between the output $I_1$ and the output $I_4$, the output $I_4$ is 270 degrees shifted in phase with respect to the output $I_1$.

Next, a description will be given of a method of how the intra-pitch relative position, x, of the glass scale 10 can be obtained based on the outputs $I_1$ to $I_4$.

First, the phase $\Phi$ at the relative position x is obtained from the following equation (I).

$$\Phi = \tan^{-1}((I_2' - I_4')/(I_1' - I_3')) \qquad (I)$$

Here, $I_1'$ to $I_4'$ are values obtained by multiplying the respective outputs $I_1$ to $I_4$ by two, and by subtracting 1 from the respective products. This is equivalent to expanding the respective outputs $I_1$ to $I_4$ from −1 to +1. The $\Phi$ obtained from equation (I) takes a value within the range of $-\pi/2$ to $\pi/2$. Therefore, $\pi$ or $2\pi$ must be added to the $\Phi$ obtained from equation (I) in accordance with the relative magnitudes and the signs of the respective outputs $I_1$ to $I_4$. Here, $\tan^{-1}$ is an arc tangent.

Next, the relative position x is obtained from the following equation (II).

$$x = \Phi \times s / 2\pi \qquad (II)$$

The above computations are performed by the intra-pitch relative position computing unit 45 in the semiconductor integrated circuit 40 shown in FIG. 4.

Next, a description will be given of a method of how the direction of movement of the glass scale 10 can be discriminated based on the outputs $I_1$ to $I_4$.

Figure 6:
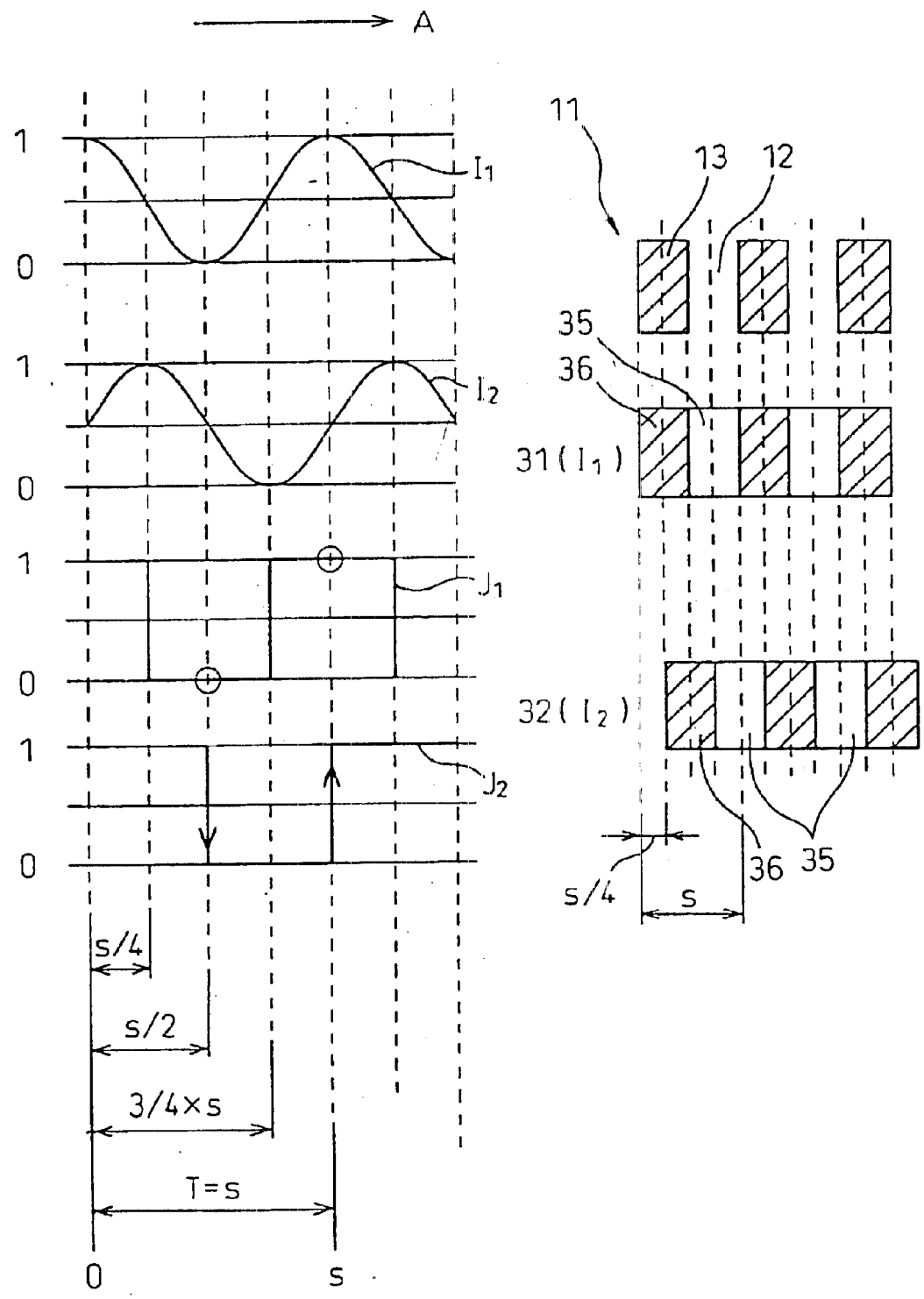
FIG. 6 is a diagram showing signal changes when a glass scale moves in direction A.
Figure 7:
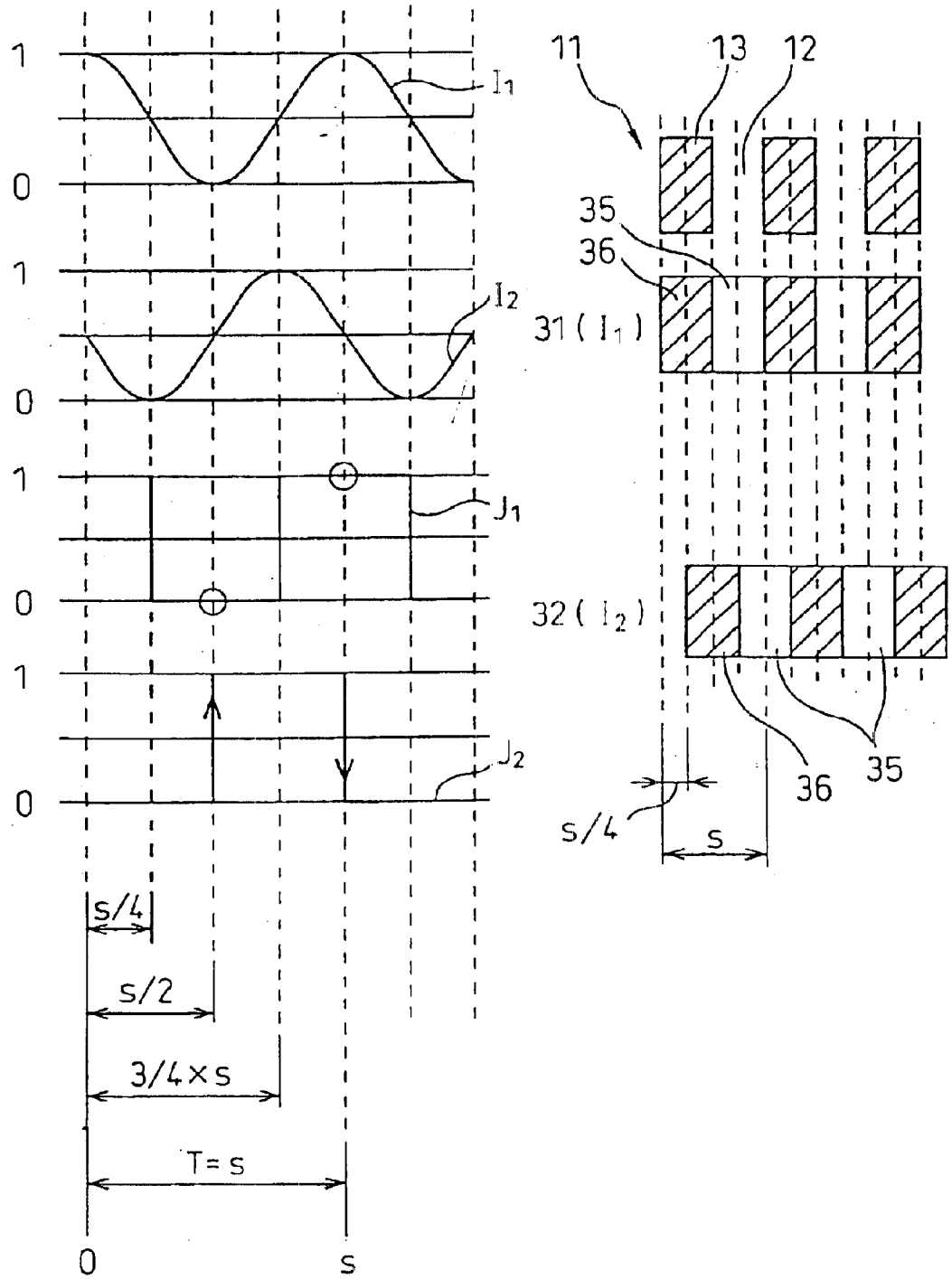
FIG. 7 is a diagram showing signal changes when the glass scale moves indirection B.

First, the outputs $I_1$ and $I_2$ as analog signals are converted to digital signals $J_1$ and $J_2$, respectively, using a threshold of 0.5, as shown in FIG. 6. FIG. 6 illustrates the case where the glass scale 10 is moved in the direction of arrow A shown in FIG. 1. FIG. 6 shows the waveforms of the outputs $I_1$ and $I_2$ along with the waveforms of the digital signals $J_1$ and $J_2$ after conversion. On the other hand, FIG. 7 illustrates the case where the glass scale 10 is moved in the direction of arrow B shown in FIG. 1. FIG. 7 shows the waveforms of the outputs $I_1$ and $I_2$ along with the waveforms of the digital signals $J_1$ and $J_2$ after conversion. In FIGS. 6 and 7, the positions of the light receiving arrays 31 and 32 relative to the position of the optical grid 11 on the glass scale 10 are also shown.

Referring to FIG. 6, when the digital signal $J_2$ falls, the digital signal $J_1$ is binary 0, and when the digital signal $J_2$ rises, the digital signal $J_1$ is binary 1. On the other hand, referring to FIG. 7, when the digital signal $J_2$ falls, the digital signal $J_1$ is binary 1, and when the digital signal $J_2$ rises, the digital signal $J_1$ is binary 0. In this way, by using the rising/falling of $J_2$ as a trigger, the direction of movement of the glass scale 10 can be discriminated.

The above has dealt with an example in which the outputs $I_1$ and $I_2$ are used, but it will be appreciated that the direction of movement of the glass scale 10 can also be discriminated using the outputs $I_3$ and $I_4$. Alternatively, the magnitude relationship among the outputs $I_1$ to $I_4$ may be converted into a digital signal and the direction of movement of the glass scale 10 may be discriminated using this digital signal.

The above conversion and discrimination process is performed by the direction discriminating computing unit 46 within the semiconductor integrated circuit 40 shown in FIG. 4.

Next, the counter 47 contained in the semiconductor integrated circuit 40 of FIG. 4 will be described.

The counter 47 counts the digital signal $J_2$ in accordance with an instruction signal supplied from the direction discriminating computing unit 46. More specifically, when the result of the discrimination by the direction discriminating computing unit 46 shows that the glass scale 10 is moving in the direction of A, for example, the counter 47 increments the count value each time when the leading edge of the digital signal $J_2$ occurs. Conversely, when the result of the discrimination by the direction discriminating computing unit 46 shows that the glass scale 10 is moving in the direction of B, the counter 47 decrements the count value each time when the trailing edge of the digital signal $J_2$ occurs.

Accordingly, pitch moving distance L can be obtained from the following equation (III).

$$L = s \times k \qquad (III)$$

where k is the count value.

Next, the current position computing unit 48 contained in the semiconductor integrated circuit 40 of FIG. 4 will be described.

The current position computing unit 48 computes the current position, H, of the glass scale 10 from the relative position x, the phase Φ at the relative position x, the count value k, and the pitch moving distance L. If the relative position in the initial state is denoted by $x_0$, the phase by $\Phi_0$, the count value by 0, and the pitch moving distance by 0 and if the relative position, when the glass scale 10 stops, is denoted by $x_1$, the phase by $\Phi_1$, the count value by $K_1$, and the pitch moving distance by $L_1$, then the current position H can be obtained from the following equation (IV) or (V).

$$H = L_1 + (x_1 - x_0) \quad \text{(IV)}$$

$$H = s \times (k_1 + (\Phi_1 - \Phi_0)/2\pi) \quad \text{(V)}$$

The current position, H, of the glass scale 10, obtained by the current position computing unit 48, is displayed as the measured value on the display device 49. The display device 49 can be mounted in a suitable position on the optical displacement measuring apparatus of the present embodiment.

Embodiment 2

A second embodiment of the present invention will be described below.

Figure 8:
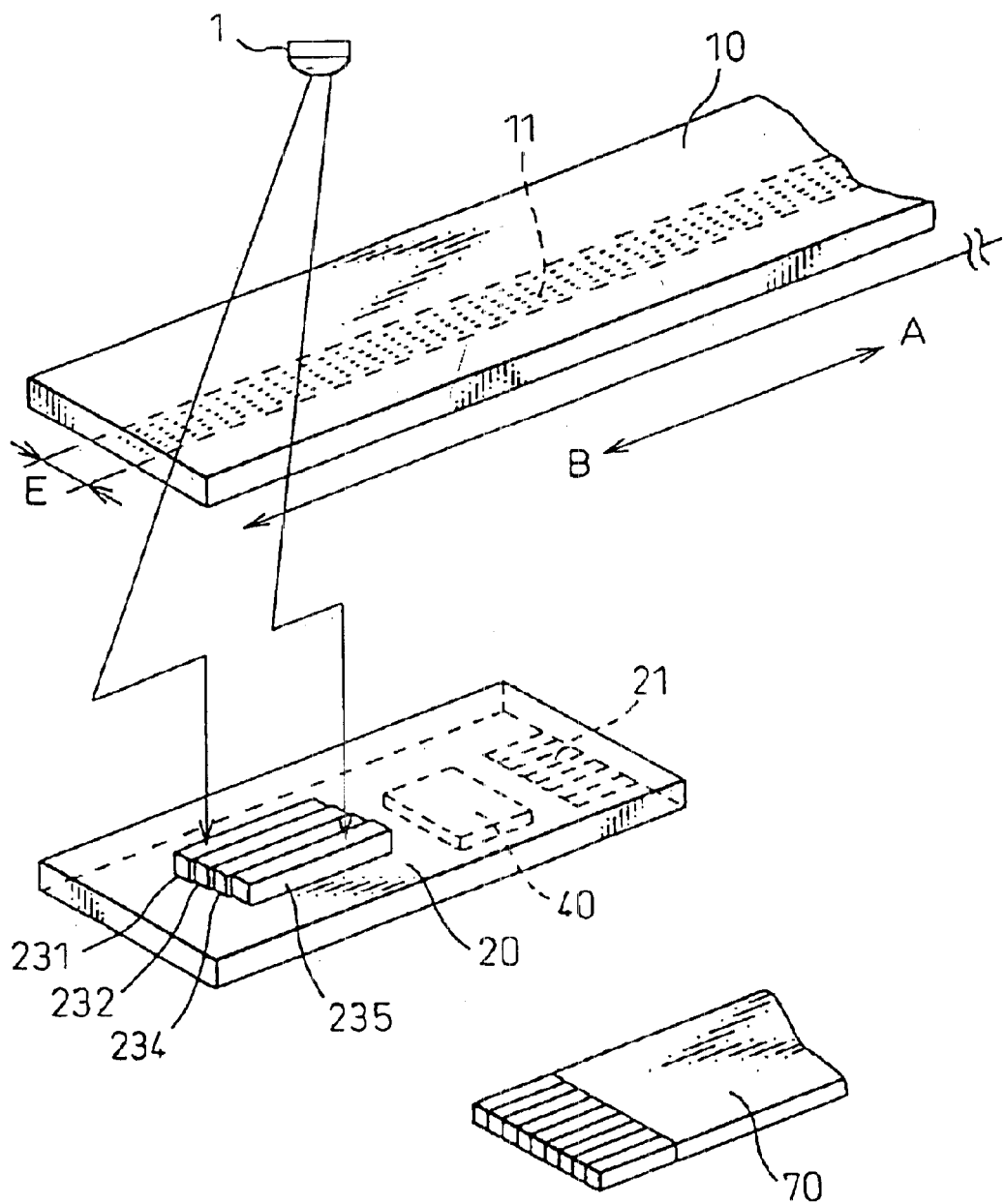
FIG. 8 is a schematic diagram showing a measuring apparatus according to a second embodiment of the present invention.

FIG. 8 is a schematic diagram showing an optical displacement measuring apparatus according to this embodiment. In the first embodiment shown in FIG. 1, the light receiving arrays 31 to 34 are arranged along the direction of movement, AB, of the glass scale 10. In contrast, in the present embodiment, light receiving arrays 231 to 234 are arranged along a direction perpendicular to the direction of movement, AB, of the glass scale 10, as shown in FIG. 8.

Figure 9:
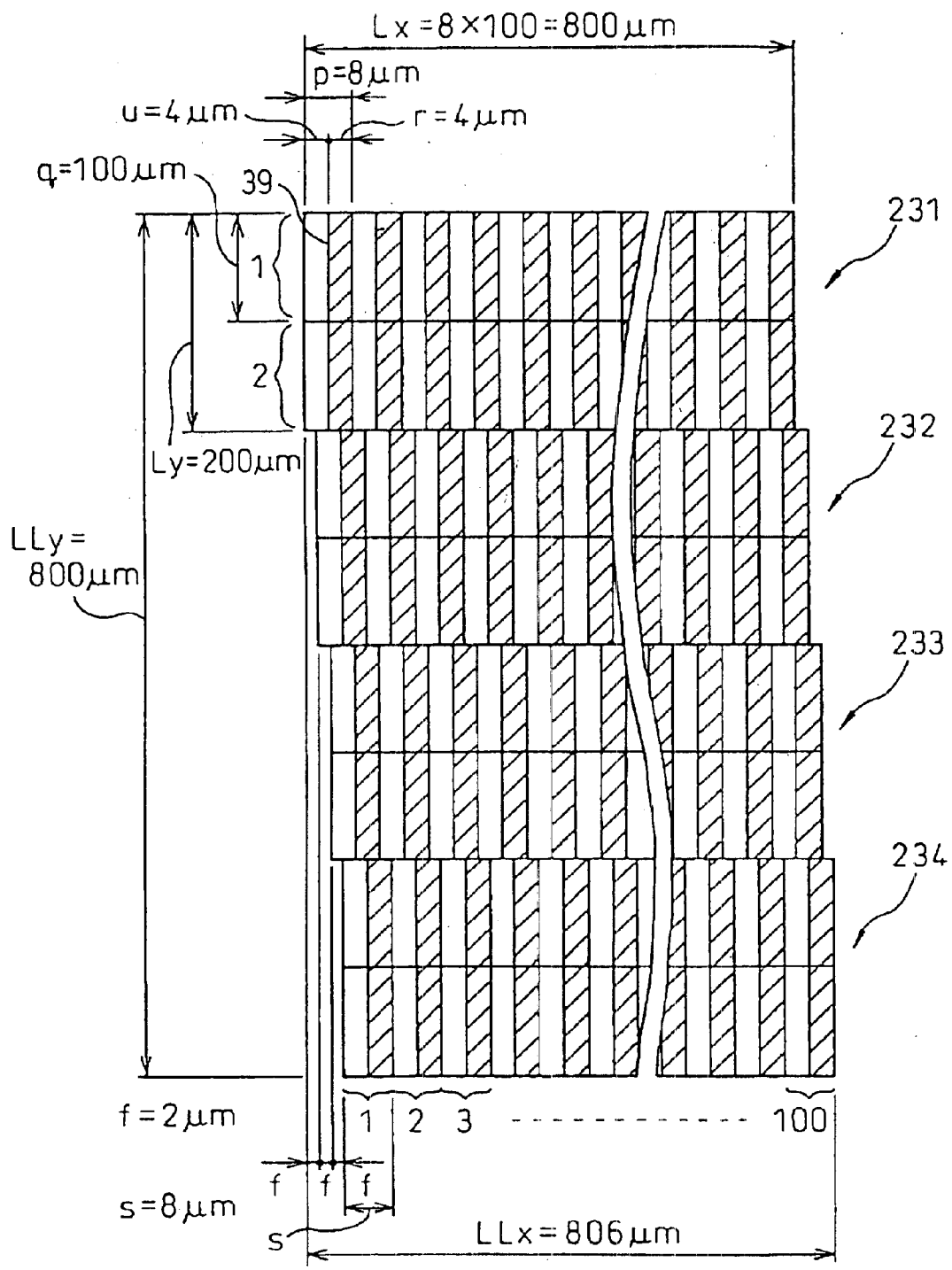
FIG. 9 is a diagram showing light receiving element arrays according to the second embodiment.

FIG. 9 is a diagram showing the details of the light receiving arrays 231 to 234. As shown in FIG. 9, the four light receiving arrays 231 to 234 are arranged side by side in a direction perpendicular to the direction of movement, AB, of the glass scale 10. Each light receiving array consists of one hundred light receiving elements 39 horizontally (along a direction parallel to A-B) and two light receiving elements 39 vertically (along a direction perpendicular to A-B). Thus, each light receiving array is constructed from a total of two hundred light receiving elements 39.

The pitch, p, of each light receiving element 39 is set at 8 μm, which is the same as the pitch, s, of the optical grid 11, while the light receiving portion u and the light insensitive portion r are each set at 4 μm. The horizontal length, Lx, of each light receiving array is, therefore, 800 μm (8×100). On the other hand, the length, q, of each light;receiving element is set at 100 μm. The vertical length, Ly, of each light receiving array is, therefore, 200 μm (100×2).

The light receiving element arrays are arranged so that one is shifted from another by f=s/4=2 μm in the horizontal direction. The horizontal length, LLx, of the light receiving arrays as a whole is, therefore, 806 μm. Generally, the horizontal length, LLx, of the light receiving element arrays as a whole can be given as s×n+(s/4)×3, where s is the pitch and n is the number of light receiving elements in the horizontal direction in each light receiving array. Accordingly, the length, L, of the optical grid 11 formed on the glass scale 10 must be set at least equal to the measuring length plus the length LLx. Further, the vertical length, LLy, of the light receiving element arrays as a whole is 800 μm (200 μm×4). Accordingly, the width, E, of the optical grid 11 formed on the glass scale 10 must be at least 800 μm.

Here, the light receiving arrays are arranged so that one is shifted from another by a distance f=s/4=2 μm, but instead, the distance f may be set, as necessary, at s×n (n is an integer)+s/4. In FIG. 9, the light receiving arrays 231 to 234 are shown as being arranged without providing any spacing between them, but instead, the light receiving arrays may be spaced apart from one another by a suitable distance.

Figure 10:
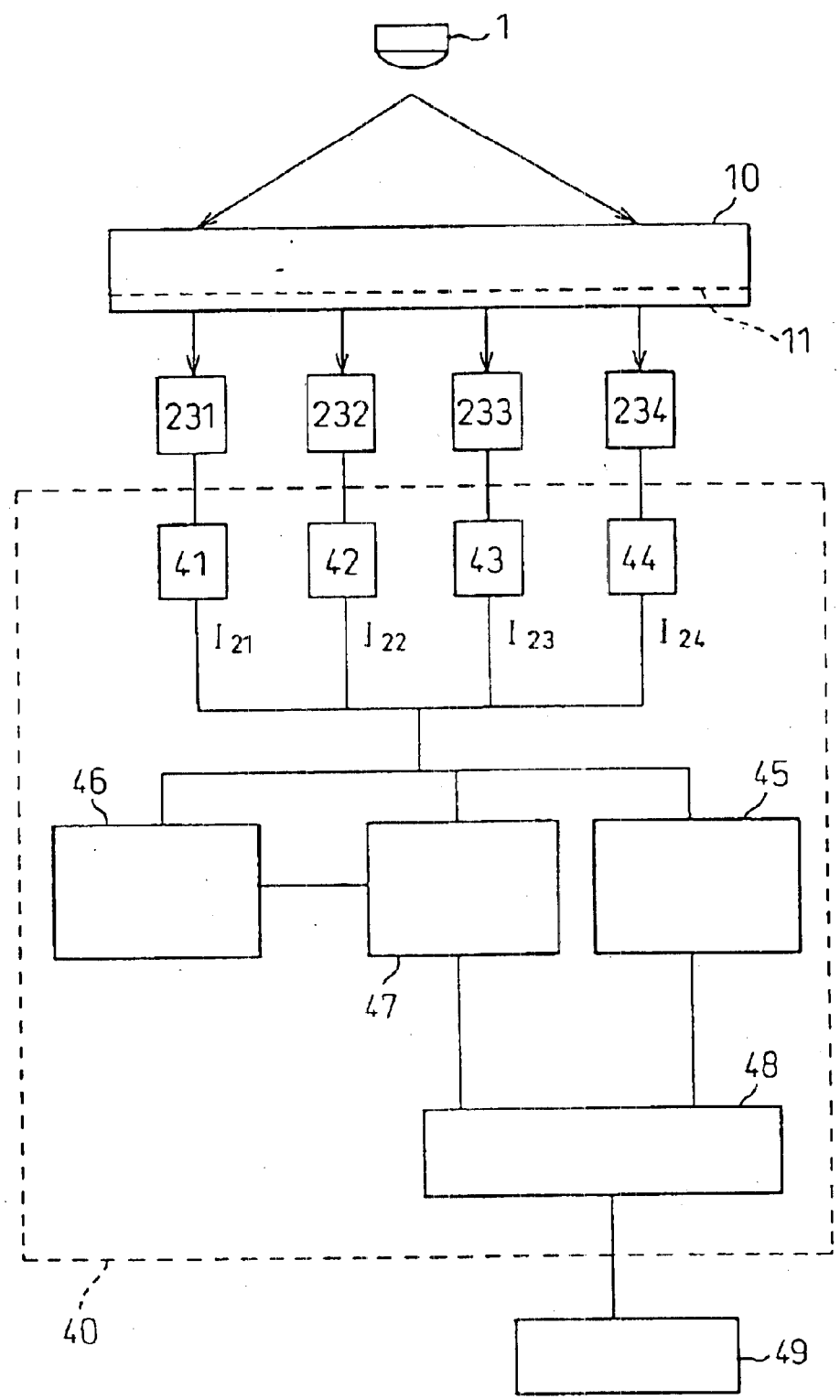
FIG. 10 is a block diagram showing a signal flow according to the second embodiment.

FIG. 10 is a block diagram illustrating signal flow in the present embodiment. Parts that are identical in function to those in FIG. 4 are designated by the same reference numerals. The outputs obtained from the light receiving arrays 231 to 234 are denoted by $I_{21}$ to $I_{24}$, respectively. Using these outputs $I_{21}$ to $I_{24}$ instead of the corresponding outputs $I_1$ to $I_4$ in the first embodiment, the current position H and the direction of movement of the glass scale 10 can be obtained in the same manner as the first embodiment.

In the first and second embodiments, the plurality of light receiving arrays are arranged only in a horizontal direction or a vertical direction with respect to the direction of movement, AB, of the glass scale 10. However, the light receiving arrays may be arranged in other suitable way, the only requirement being that the outputs from the four light receiving arrays be shifted in phase by 90 degrees relative to one another. For example, it is also possible to arrange two light receiving arrays vertically and two light receiving arrays horizontally, or to arrange the four light receiving element arrays in an oblique direction.

The first and second embodiments have been described as using four light receiving element arrays. It will, however, be noted that the current position H and the direction of movement of the glass scale 10 can also be computed using two light receiving element arrays.

More specifically, in the first embodiment, the output $I_1$ of the light receiving element array 31 and the output $I_3$ of the light receiving element array 33 are exactly 180 degrees apart in phase, as shown in FIG. 5. Likewise, the output $I_2$ of the light receiving element array 32 and the output $I_4$ of the light receiving element array 34 are exactly 180 degrees apart in phase. Accordingly, $(I_1'-I_3')$ and $(I_2'-I_4')$ in equation (I) can be replaced by $2I_1'$ and $2I_2'$, respectively. Then, equation (I) can be transformed into the following equation (VI).

$$\Phi = \tan^{-1}(I_2'/I_1') \quad \text{(VI)}$$

The Φ obtained from equation (VI) takes a value within the range of $-\pi/2$ to $\pi/2$. Therefore, $\pi$ or $2\pi$ must be added to the Φ obtained from equation (VI) in accordance with the signs of the respective outputs $I_1$ and $I_2$. In this way, the phase Φ can be obtained using only the two outputs $I_1$ and $I_2$. That is, only two light receiving arrays 31 and 32 need to be provided in this case. The method of computing the relative position x and current position H is the same as that in the first embodiment, and will not be described in detail here.

When using only two light receiving arrays, an error tends to occur in the value of $\tan^{-1}$ when the value of the output $I_1$ or $I_2$ is at or near −1 or 1. When using four light receiving arrays, on the other hand, the outputs $I_2$ and $I_4$ can be used when the value of the output $I_1$ or $I_3$ is at or near −1 or 1, while when the value of the output $I_2$ or $I_4$ is at or near −1 or 1, the outputs $I_1$ and $I_3$ can be used. Accordingly, when four light receiving arrays are used, the measurement accuracy can be further enhanced over the entire range.

The first and second embodiments have been described dealing with the case where four or two light receiving arrays are arranged in such a manner as to be shifted from one another. The light receiving arrays are so arranged in order to shift the phase of each light receiving element by 90 degrees. It will, however, be noted that the number of light receiving arrays is not limited to four or two, but the necessary number of light receiving arrays can be provided according to the phase angle (°) of the output to be measured, that is, in the quantity equal to the number obtained by dividing 360 by the desired phase angle, for example, six light receiving arrays if it is desired to obtain an output for every 60 degrees, eight light receiving arrays if it is desired to obtain an output for every 45 degrees, and so on.

Further, the first and second embodiments have been described dealing with the case where the light receiving elements are arranged in such a manner as to be shifted from one another by s/4. In this case also, the light receiving elements are so arranged in order to shift the phase of each light receiving element by 90 degrees. Here again, the amount of displacement of each light receiving element can be varied according to the phase angle of the output to be obtained, for example, s/6 if it is desired to obtain an output for every 60 degrees, s/8 if it is desired to obtain an output for every 45 degrees, and so on.

In this way, by increasing the number of light receiving arrays, the measurement accuracy can be further enhanced because an output curve with improved linearity can be used.

Embodiment 3

A third embodiment of the present invention will be described below.

Figure 11:
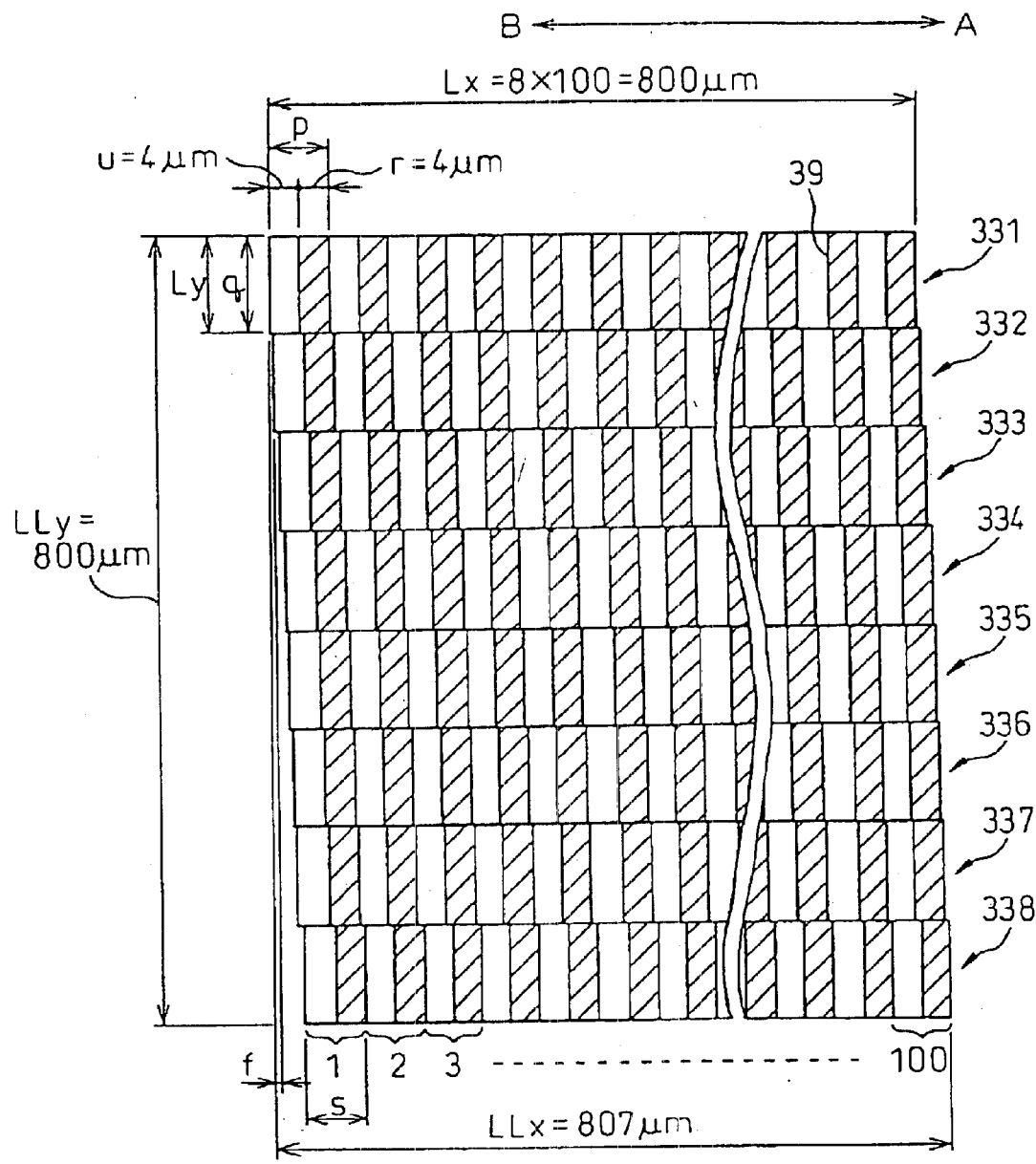
FIG. 11 is a diagram showing light receiving element arrays according to a third embodiment.

In the optical displacement measuring apparatus according to the present embodiment, the positional relationships among the light source 1, the glass scale 10, and the substrate 20 are the same as those in the second embodiment. In the present embodiment, however, eight light receiving arrays 331 to 338 are arranged side by side, as shown in FIG. 11, in a direction perpendicular to the direction of movement, AB, of the glass scale 10. As shown in FIG. 11, each light receiving array consists of one hundred light receiving elements 39 horizontally (along a direction parallel to A-B) and one light receiving element 39 vertically (along a direction perpendicular to A-B). Thus, each light receiving array is constructed from a total of one hundred light receiving elements 39.

The pitch, p, of each light receiving element 39 is set at 8 μm, which is the,same as the pitch, s, of the optical grid 11. Likewise, the light receiving portion u and the light insensitive portion r are each set at 4 μm, which is the same as the transparent portion 12 and the opaque portion 13 of the optical grid 11. The horizontal length, Lx, of each light receiving array is, therefore, 800 μm (8×100). On the other hand, the length, q, of each light receiving element is set at 100 μm; therefore, the vertical length, Ly, of each light receiving array is also 100 μm.

The light receiving arrays are arranged so that one is shifted from another by f=s/8=1 μm in the horizontal direction. The horizontal length, LLx, of the light receiving arrays as a whole is, therefore, 807 μm. Accordingly, the length, L, of the optical grid 11 formed on the glass scale 10 must be set at least equal to the measuring length plus the length LLx. Further, the vertical length, LLy, of the light receiving arrays as a whole is 800 μm (100 μm×8). Accordingly, the width, E, of the optical grid 11 informed on the glass scale 10 must be at least 800 μm.

Here, the light receiving arrays are arranged so that one is shifted from another by a distance f=s/8=1 μm, but instead, the distance f may be set, as necessary, at s×n (n is an integer)+s/8. In FIG. 11, the light receiving arrays are shown as being arranged without providing any spacing between them, but instead, the light receiving arrays may be spaced apart from one another by a suitable distance.

Figure 12:
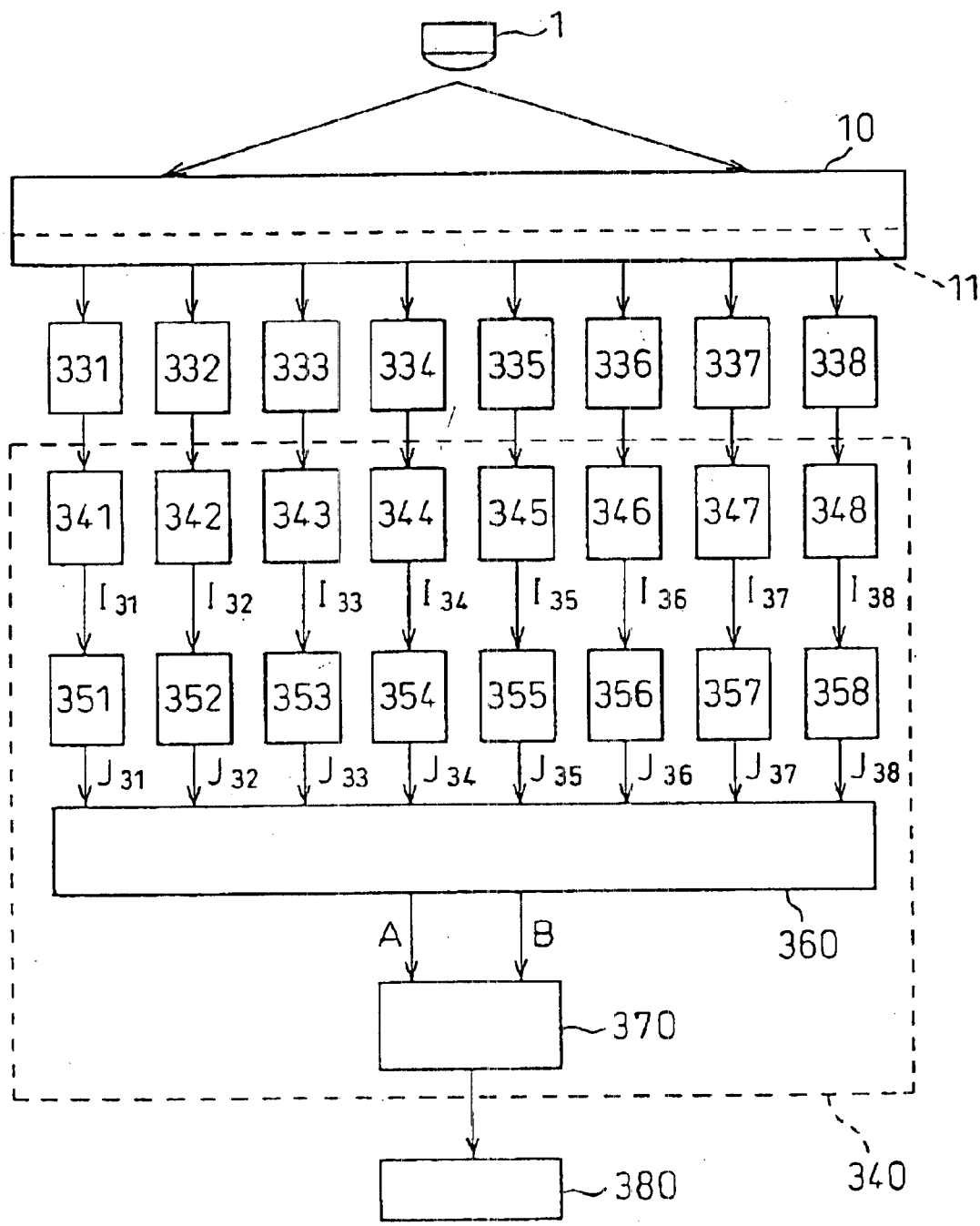
FIG. 12 is a block diagram showing a signal flow according to the third embodiment.

FIG. 12 is a block diagram illustrating signal flow in the present embodiment. Reference numerals 341 to 348 are adders, which are connected to the respective light receiving arrays. Each adder adds together the outputs of all the light receiving elements in its associated light receiving array. In the present embodiment, since each light receiving array consists of one hundred light receiving elements 39, a 100-times output can be obtained. $I_{31}$ to $I_{38}$ denote the outputs of the respective adders 341 to 348.

Figure 13:
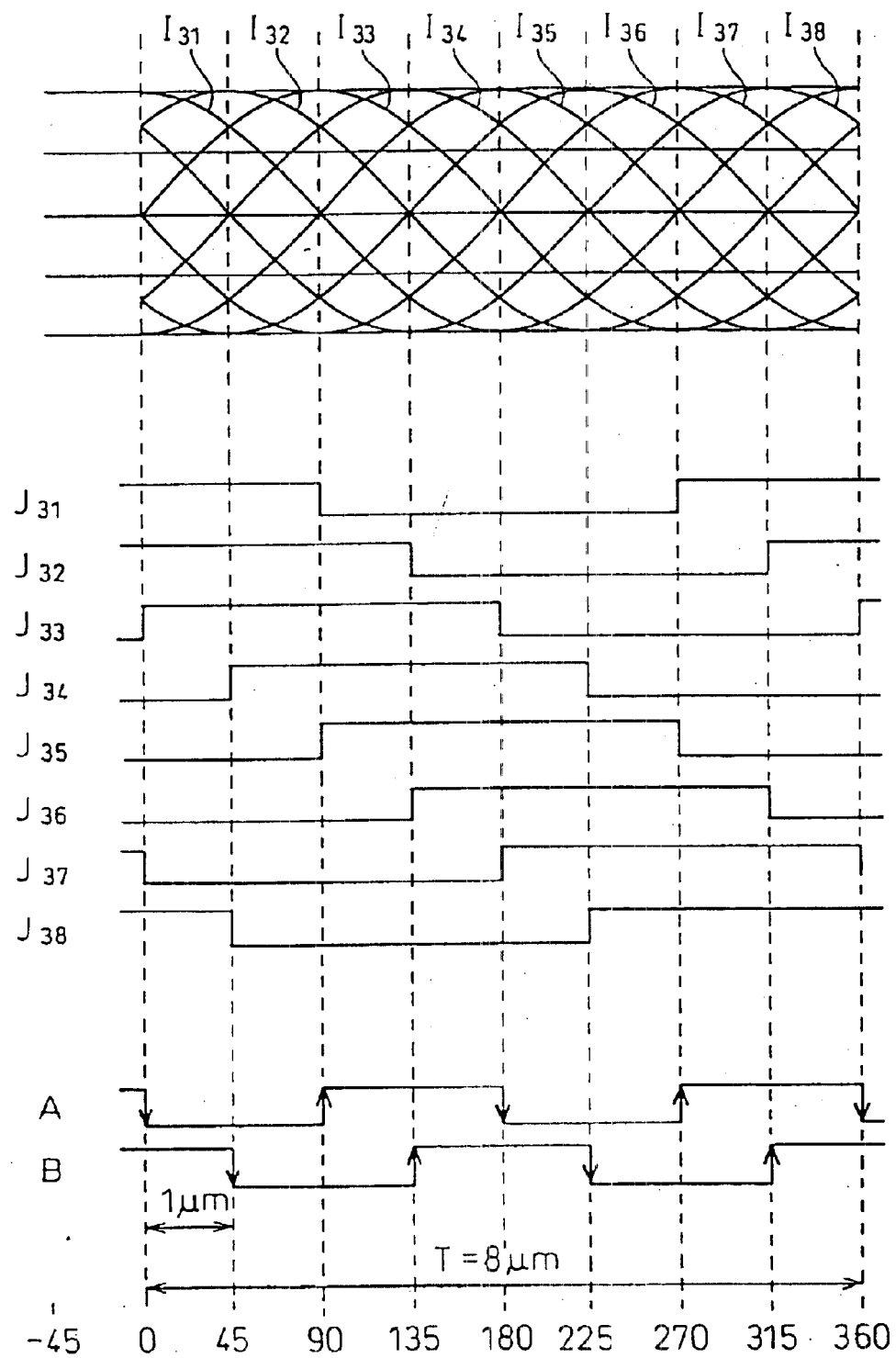
FIG. 13 is a diagram showing changes of signals obtained from light receiving elements according to the third embodiment.

FIG. 13 illustrates how the outputs $I_{31}$ to $I_{38}$ change when the glass scale 10 is moved in the direction of arrow A. First, the output $I_{31}$ of the light receiving array 331 will be explained. It is assumed here that the initial state of the output $I_{31}$ is given when the transparent portion 12 of the optical grid 11 is aligned with the light reception active portion 35 of the light receiving array 331. In this initial state, therefore, the output $I_{31}$ takes a maximum value. The maximum value at this time is normalized to 1. As can be seen from FIG. 13, the output $I_{32}$ is shifted in phase by 45 degrees with respect to the output $I_{31}$. Likewise, the outputs $I_{33}$ to $I_{38}$ are shifted in phase by 45 degree, respectively.

In FIG. 12, reference numerals 351 to 358 are comparators, which are connected to the respective adders. The comparators 351 to 358 convert the outputs $I_{31}$ to $I_{38}$ into digital signals $J_{31}$ to $J_{38}$ by using a threshold of 0.5. In FIG. 13, the digital signals $J_{31}$ to $J_{36}$ are also shown.

Here, signals A and B are defined as follows. The signals A and B are generated by a logic operation circuit 360 connected to the comparators 351 to 358.

$$A = J_{31} \cdot J_{37} + J_{33} \cdot J_{35}$$

$$B = J_{32} \cdot J_{38} + J_{34} \cdot J_{36}$$

The signals A and B are shown in FIG. 13. Since the pitch of the light receiving elements 39 in each light receiving array is 8 μm, the digital signals $J_{31}$ to $J_{38}$ each periodically vary with a cycle T=8 μm. Accordingly, the leading edge/trailing edge of the signals A and B occurs exactly at every 1 μm. Then, a counter 370 connected to the logic operation circuit 360 increments its count value by using the leading edge/trailing edge of the signals A and B as a trigger. This means that the counter 370 increments by 1 for every 1 μm movement of the glass scale.

When the count value of the counter 370 in the initial state is set to 0, the count value×1 μm indicates the current position of the glass scale 10. Accordingly, by displaying the count value of the counter 370 directly on the external display device 380, the measured value can be displayed in units of 1 μm.

Embodiment 4

A fourth embodiment of the present invention will be described below.

In the optical displacement measuring apparatus according to the present embodiment, the positional relationships among the light source 1, the glass scale 10, and the substrate 20 are the same as those in the second embodiment. In the present embodiment, however, four light receiving arrays 431 to 434 are arranged side by side, as shown in FIG. 14, in a direction perpendicular to the direction of movement, AB, of the glass scale 10.

The present embodiment is intended to achieve the same results as the third embodiment by using the four light receiving arrays 431 to 434. In FIG. 13, it is noted that the digital signal $J_{31}$ and the digital signal $J_{35}$ are exactly 180 degrees apart in phase. This means that the digital signal $J_{35}$ can be generated by inverting $J_{31}$. Likewise, the digital signals $J_{36}$, $J_{37}$, and $J_{38}$ can be generated from $J_{32}$, $J_{33}$, and $J_{34}$, respectively. Accordingly, using the four light receiving arrays, measuring can be performed in a manner similar to the third embodiment.

Figure 14:
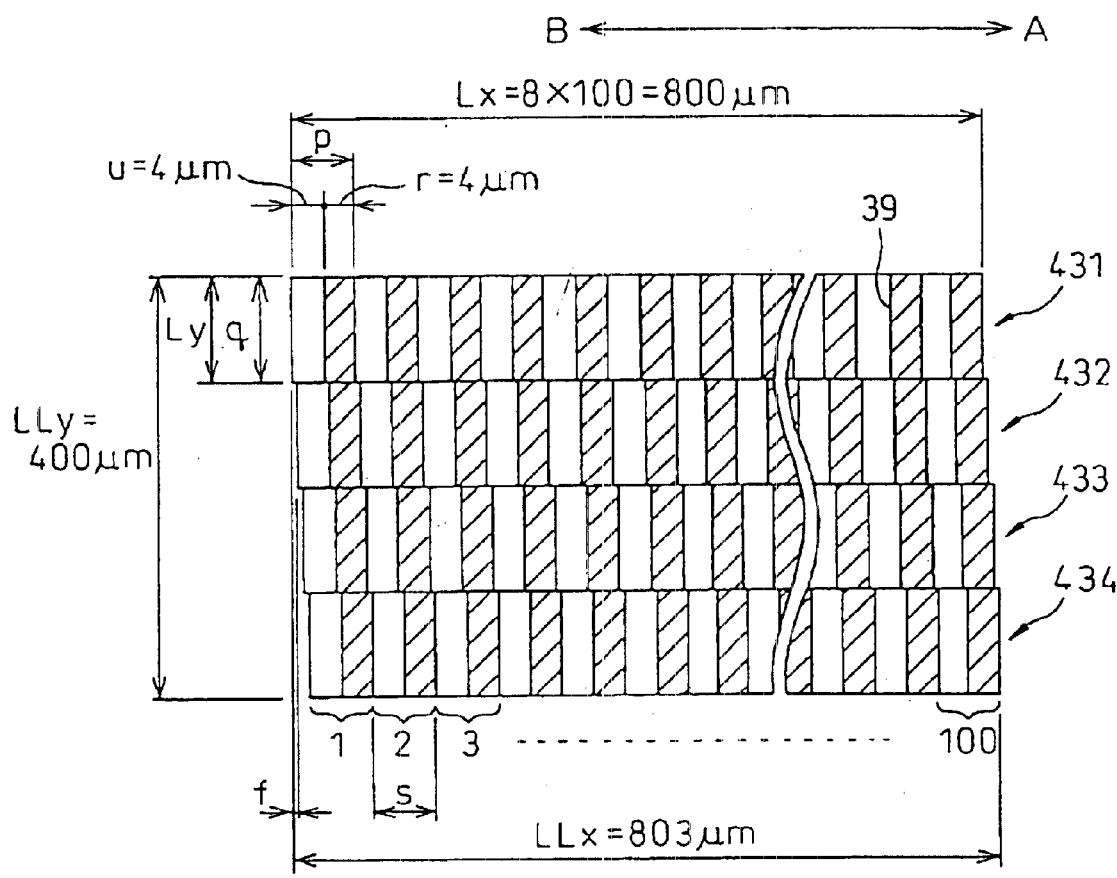
FIG. 14 is a diagram showing light receiving element arrays according to a fourth embodiment.

FIG. 14 shows the details of the light receiving arrays 431 to 434 in the present embodiment. As shown in FIG. 14, the four light receiving arrays 431 to 434 are arranged side by side in a direction perpendicular to the direction of movement, AB, of the glass scale 10. Each light receiving array consists of one hundred light receiving elements 39 horizontally (along a direction parallel to A-B) and one light receiving element 39 vertically (along a direction perpendicular to A-B). Thus, each light receiving array is constructed from a total of one hundred light receiving elements 39.

The pitch, p, of each light receiving element 39 is set at 8 μm, which is the same as the pitch, s, of the optical grid 11. Likewise, the light receiving portion u and the light insensitive portion r are each set at 4 μm, which is the same as the transparent portion 12 and the opaque portion 13 of the optical grid 11. The horizontal length, Lx, of each light receiving array is, therefore, 800 μm (8×100). On the other hand, the length, q, of each light receiving element is set at 100 μm; therefore, the vertical length, Ly, of each light receiving element array is also 100 μm.

The light receiving arrays are arranged so that one is shifted from another by f=s/8=1 μm in the horizontal direction. The horizontal length, LLx, of the light receiving arrays as a whole is, therefore, 803 μm. Accordingly, the length, L, of the optical grid 11 formed on the glass scale 10 must be set at least equal to the measuring length plus the length LLx. Further, the vertical length, LLy, of the light receiving element arrays as a whole is 400 μm (100 μm×4). Accordingly, the width, E, of the optical grid 11 formed on the glass scale 10 must be at least 400 μm.

Here, the light receiving arrays are arranged so that one is shifted from another by a distance f=s/8=1 μm, but instead, the distance f may be set, as necessary, at s×n (n is an integer)+s/8. In FIG. 14, the light receiving arrays 431 to 434 are shown as being arranged without providing any spacing between them, but instead, the light receiving arrays may be spaced apart from one another by a suitable distance.

Figure 15:
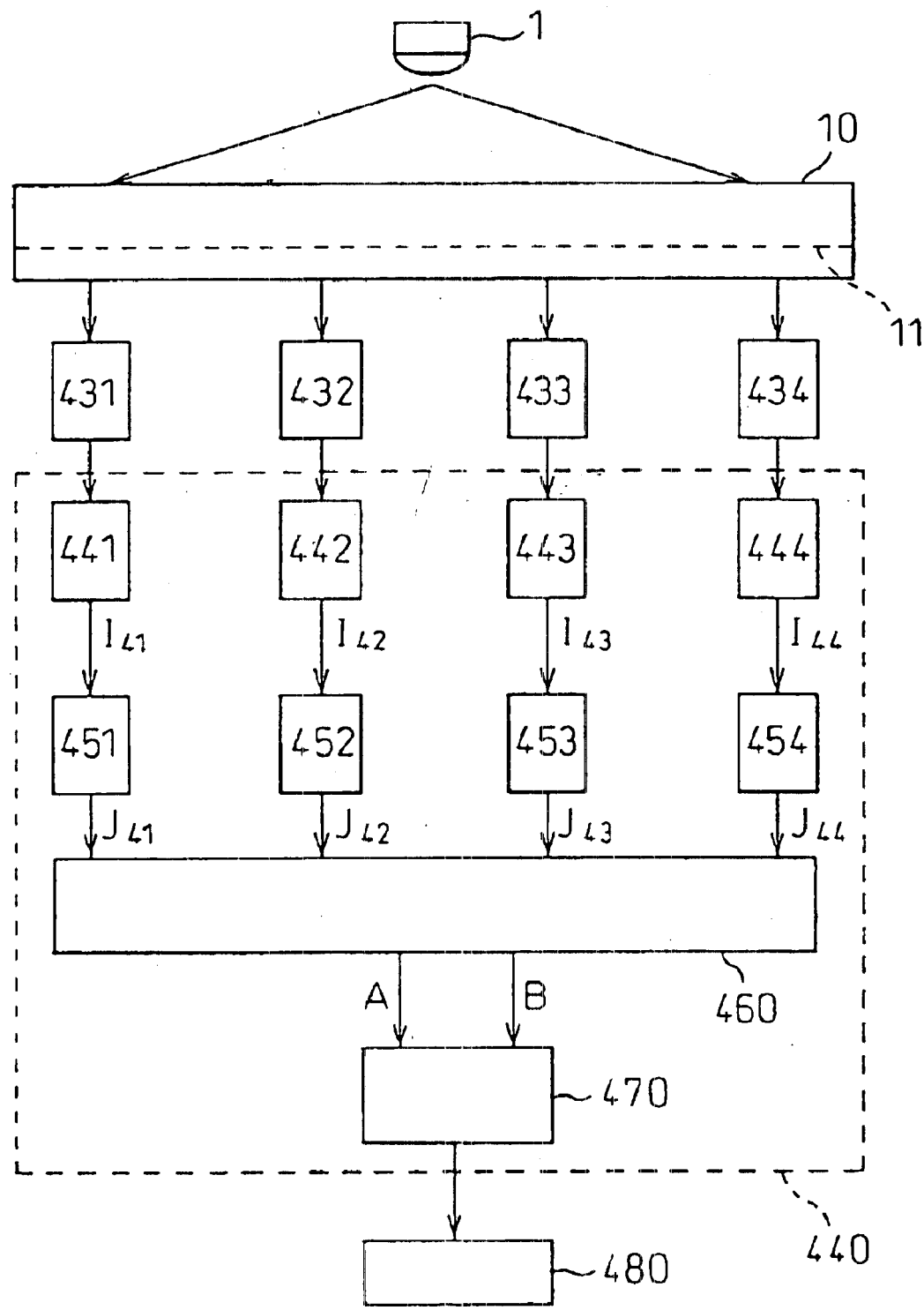
FIG. 15 is a block diagram showing a signal flow according to the fourth embodiment.

FIG. 15 is a block diagram illustrating signal flow in the present embodiment. Reference numerals 441 to 444 are adders, which are connected to the respective light receiving arrays. Each adder adds together the outputs of all the light receiving elements in its associated light receiving array. In the present embodiment, since each light receiving array consists of one hundred light receiving elements 39, a 100-times output can be obtained. $I_{41}$ to $I_{44}$ denote the outputs of the respective adders 441 to 444.

Figure 16:
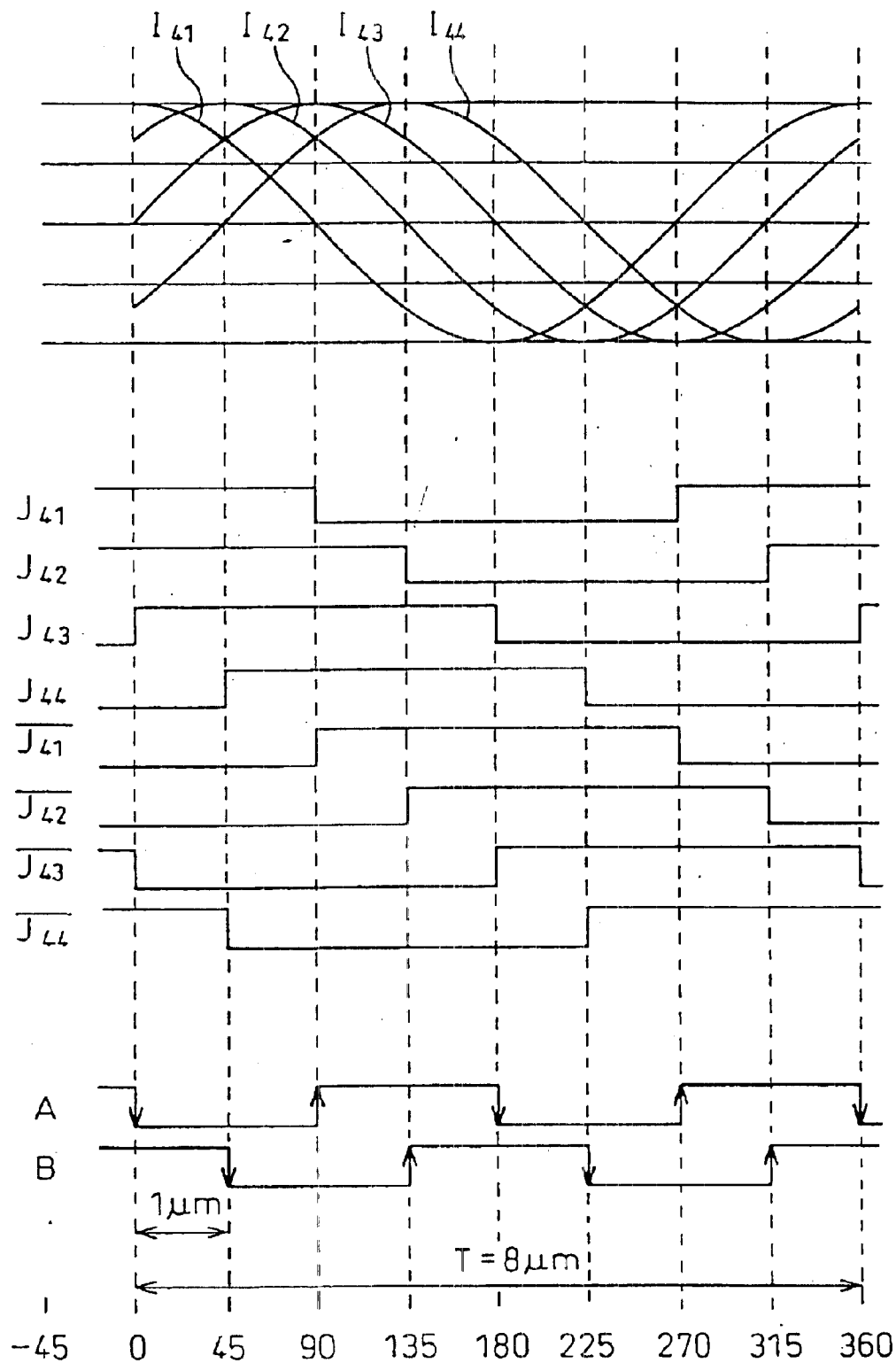
FIG. 16 is a diagram showing changes of signals obtained from light receiving elements according to the fourth embodiment.

FIG. 16 illustrates how the outputs $I_{41}$ to $I_{44}$ change when the glass scale 10 is moved in the direction of arrow A. First, the output 14, of the light receiving array 431 will be explained. It is assumed here that the initial state of the output $I_{41}$ is given when the transparent portion 12 of the optical grid 11 is aligned with the light reception active portion 35 of the light receiving array 431. In this initial state, therefore, the output $I_{41}$ takes a maximum value. The maximum value at this time is normalized to 1. As can be seen from FIG. 16, the output $I_{42}$ is shifted in phase by 45 degrees with respect to the output $I_{41}$. Likewise, the outputs $I_{43}$ and $I_{44}$ are shifted in phase by 45 degree, respectively.

In FIG. 15, reference numerals 451 to 454 are comparators, which are connected to the respective adders. The comparators 451 to 454 convert the outputs $I_{41}$ to $I_{44}$ into digital signals $J_{41}$ to $J_{44}$ using a threshold of 0.5. In FIG. 16, the digital signals $\overline{J_{41}}$ to $\overline{J_{44}}$ are shown along with digital signals $J_{41}$ to $J_{44}$. $\overline{J_{41}}$ to $\overline{J_{44}}$ are inverted versions of $J_{41}$ to $J_{44}$, and are generated by a logic operation circuit 460.

Here signals A and B are defined as follows. The signals A and B are generated by the logic operation circuit 460 connected to the comparators 451 to 454.

$$A = J_{41} \cdot \overline{J_{43}} + J_{43} \cdot \overline{J_{41}} = J_{41} \oplus J_{43}$$

$$B = J_{42} \cdot \overline{J_{44}} + J_{44} \cdot \overline{J_{42}} = J_{42} \oplus J_{44}$$

Here, symbol $\oplus$ denotes an exclusive-OR operation. Therefore, if an exclusive-OR circuit is used for the logic operation circuit, the inverted signals need not be generated, and the logic circuit can be simplified. That is, in equations $$A = J_{41} \oplus J_{43} \text{ and } B = J_{42} \oplus J_{44}$$

inverted signals are not contained.

The signals A and B are shown in FIG. 16. Since the pitch of the light receiving elements 39 in each light receiving array is 8 μm, the digital signals $J_{41}$ to $J_{44}$ each periodically vary with a cycle T=8 μm. Accordingly, the leading edge/trailing edge of the signals A and B occurs exactly at every 1 μm. Then, a counter 470 connected to the logic operation circuit 460 increments its count value by using the leading edge/trailing edge of the signals A and B as a trigger. This means that the counter 470 increments by 1 for every 1 μm movement of the glass scale.

When the count value of the counter 470 in the initial state is set to 0, the count value×1 μm indicates the current position of the glass scale. Accordingly, by displaying the count value of the counter 470 directly on the external display device 480, the measured value can be displayed in units of 1 μm. Thus, the same results as in the third embodiment can be obtained using the four light receiving arrays 431 to 434.

Embodiment 5

A fifth embodiment of the present invention will be described below.

In the optical displacement measuring apparatus according to the present embodiment, the positional relationships among the light source 1, the glass scale 10, and the substrate 20 are the same as those in the second embodiment. The present embodiment, however, uses eight light receiving arrays 331 to 338, such as shown in FIG. 11, to enhance the measurement accuracy.

Figure 17:
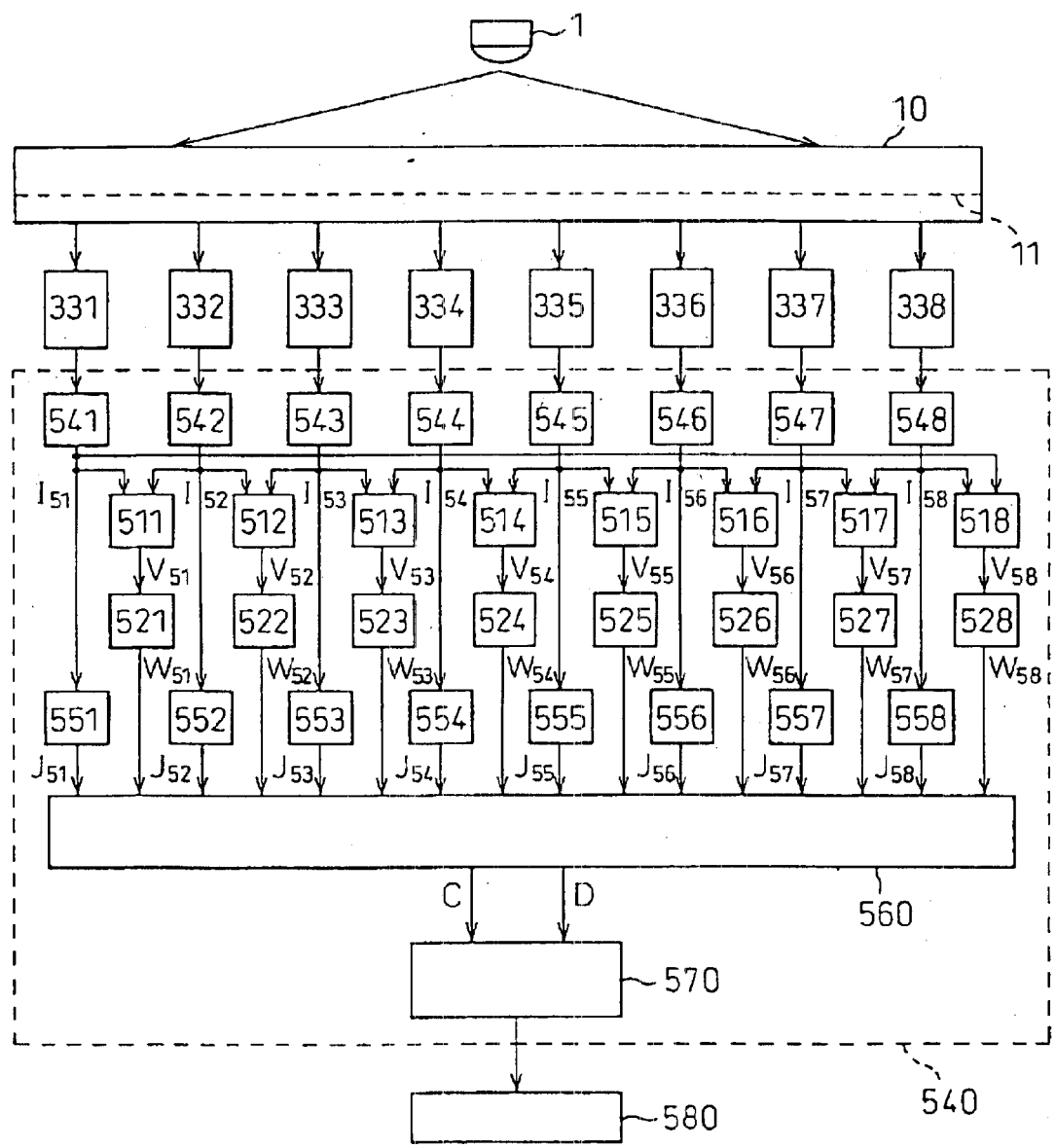
FIG. 17 is a block diagram showing a signal flow according to a fifth embodiment.

FIG. 17 is a block diagram illustrating signal flow in the present embodiment. Reference numerals 541 to 548 are adders, which are connected to the respective light receiving arrays 331 to 338. Each adder adds together the outputs of all the light receiving elements in its associated light receiving array. In the present embodiment, since each light receiving array consists of one hundred light receiving elements 39, a 100-times output can be obtained. $I_{51}$ to $I_{58}$ denote the outputs of the respective adders 541 to 548.

Figure 18:
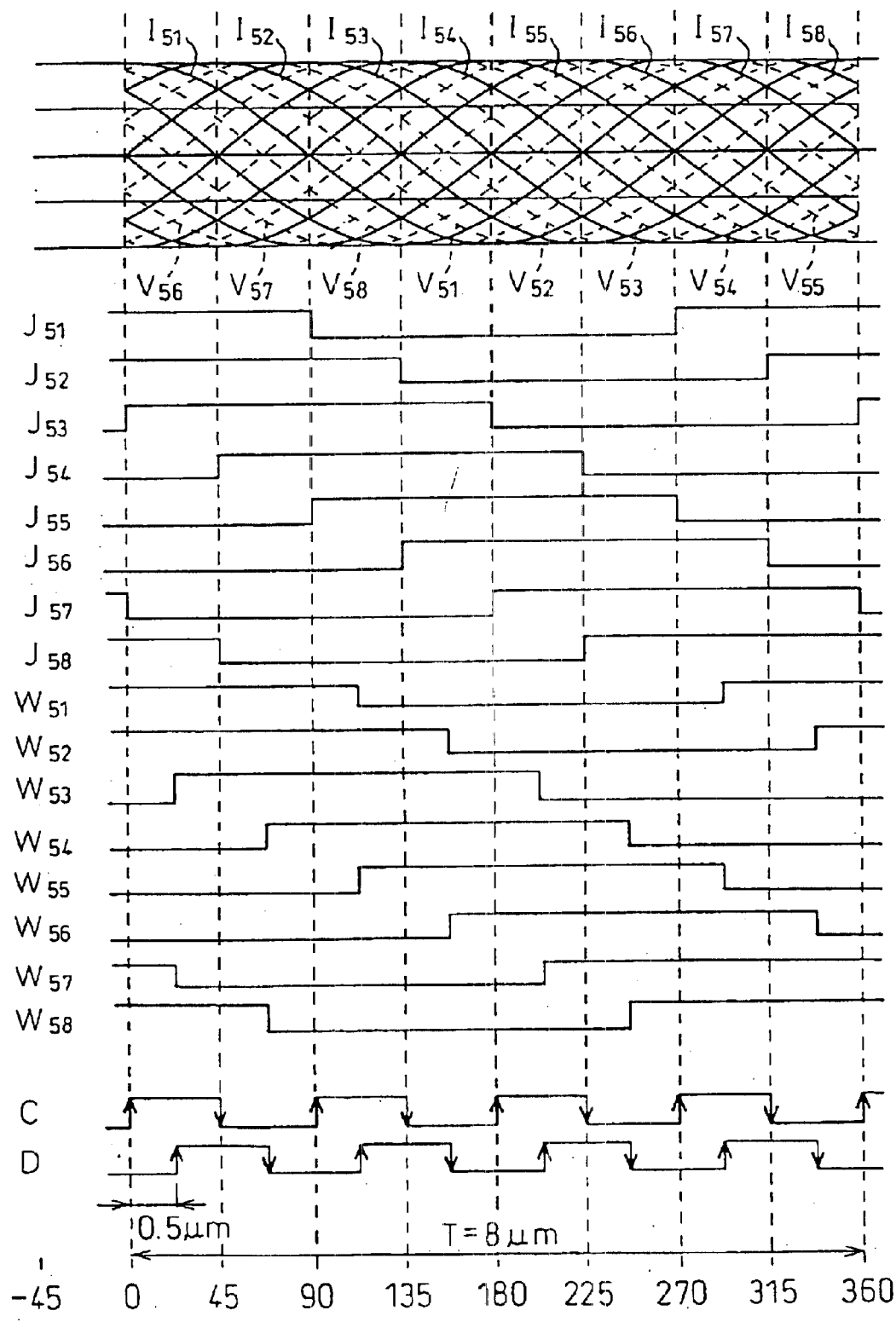
FIG. 18 is a diagram showing changes of signals obtained from light receiving elements according to the fifth embodiment.

FIG. 18 illustrates, using solid lines, how the outputs $I_{51}$ to $I_{58}$ change when the glass scale 10 is moved in the direction of arrow A. First, the output $I_{51}$ of the light receiving array 331 will be explained. It is assumed here that the initial state of the output $I_{51}$ is given when the transparent portion 12 of the optical grid 11 is aligned with the light receiving portion 35 of the light receiving array 331. In this initial state, therefore, the output $I_{51}$ takes a maximum value. The maximum value at this time is normalized to 1. As can be seen from FIG. 18, the output $I_{52}$ is shifted in phase by 45 degrees with respect to the output $I_{51}$. Likewise, the outputs $I_{53}$ to $I_{58}$ are shifted in phase by 45 degrees, respectively.

In FIG. 17, reference numerals 551 to 558 are comparators, which are connected to the respective adders 541 to 548. The comparators 551 to 558 convert the outputs $I_{51}$ to $I_{58}$ into digital signals $J_{51}$ to $J_{58}$ by using a threshold of 0.5. In FIG. 18, the digital signals $J_{51}$ to $J_{58}$ are also shown.

In FIG. 17, reference numerals 511 to 518 are analog adders. The analog adder 511 adds the outputs $I_{51}$ and $I_{52}$ and divides the sum by two to generate an output $V_{51}$. In the same manner, outputs $V_{52}$ to $V_{58}$ are generated by the analog adders 512 to 518, respectively. In FIG. 18, the generated outputs $V_{51}$ to $V_{58}$ are shown by dashed lines. As can be seen from FIG. 18, the output $V_{52}$ is shifted in phase by 45 degrees with respect to the output $V_{51}$. Likewise, the outputs $V_{53}$ to $V_{58}$ are shifted in phase by 45 degrees, respectively.

Reference numerals 521 to 528 in FIG. 17 are also comparators, which are connected to the respective analog adders 511 to 518. The comparators 521 to 528 convert the outputs $V_{51}$ to $V_{58}$ into digital signals $W_{51}$ to $W_{58}$ by using a threshold of 0.5. In FIG. 18, the digital signals $W_{51}$ to $W_{58}$ are also shown.

Here, signals C and D are defined as follows. The signals C and D are generated by a logic operation circuit 560 connected to the comparators 551 to 558 and 521 to 528.

$$C = J_{51} \cdot J_{56} + J_{53} \cdot J_{58} + J_{52} \cdot J_{55} + J_{54} \cdot J_{57}$$

$$D = W_{51} \cdot W_{56} + W_{53} \cdot W_{58} + W_{52} \cdot W_{55} + W_{54} \cdot W_{57}$$

The signals C and D are shown in FIG. 18. Since the pitch of the light receiving elements 39 in each light receiving array is 8 μm, the digital signals $J_{51}$ to $J_{58}$ each periodically vary with a cycle T=8 μm. Accordingly, the leading edge/trailing edge of the signals C and D occurs exactly at every 0.5 μm. Then, a counter 570 connected to the logic operation circuit 560 increments its count value by using the leading edge/trailing edge of the, signals C and D as a trigger. This means that the counter 570 increments by 1 for every 0.5 μm movement of the glass scale.

When the count value of the counter 570 in the initial state is set to 0, the count value×0.5 μm indicates the current position of the glass scale. The count value of the counter 570 is displayed on the external display device 580.

As described above, in the present embodiment, two outputs, 45 degrees apart in phase, are added together by each analog adder and the sum is divided by two. Here, consider the processing of the two outputs $I_{51}$ and $I_{52}$. Assuming that $I_{51}$ is $\sin\alpha$ and $I_{52}$ is $\sin(\alpha+45°)$, the output $V_{51}$ is then $1/2(I_{51}+I_{52})=0.92\times\sin(\alpha+45/2°)$. As can be seen, $V_{51}$ is at the midpoint between $I_{51}$ and $I_{52}$. Since the amplitude of $V_{51}$ is smaller than the amplitude of $I_{51}$, the amplitude of $W_{51}$ is adjusted by correcting the op-amp amplification factor of the analog adder.

Embodiment 6

A sixth embodiment of the present invention will be described below.

In the optical displacement measuring apparatus according to the present embodiment, the positional relationships among the light source 1, the glass scale 10, and the substrate 20 are the same as those in the second embodiment.

The present embodiment is intended to achieve the same results as the fifth embodiment by using four light receiving arrays. In FIG. 18, it is noted that the digital signal $J_{51}$ and the digital signal $J_{55}$ are exactly 180 degrees apart in phase. This means that the digital signal $J_{55}$ can be generated by inverting $J_{51}$. Likewise, the digital signals $J_{56}$, $J_{57}$, and $J_{58}$ can be generated from $J_{52}$, $J_{53}$, and $J_{54}$, respectively. Accordingly, using the four light receiving arrays, measuring can be performed in a manner similar to the fifth embodiment. In the present embodiment, the light receiving arrays 431 to 434 shown in FIG. 14 are used.

Figure 19:
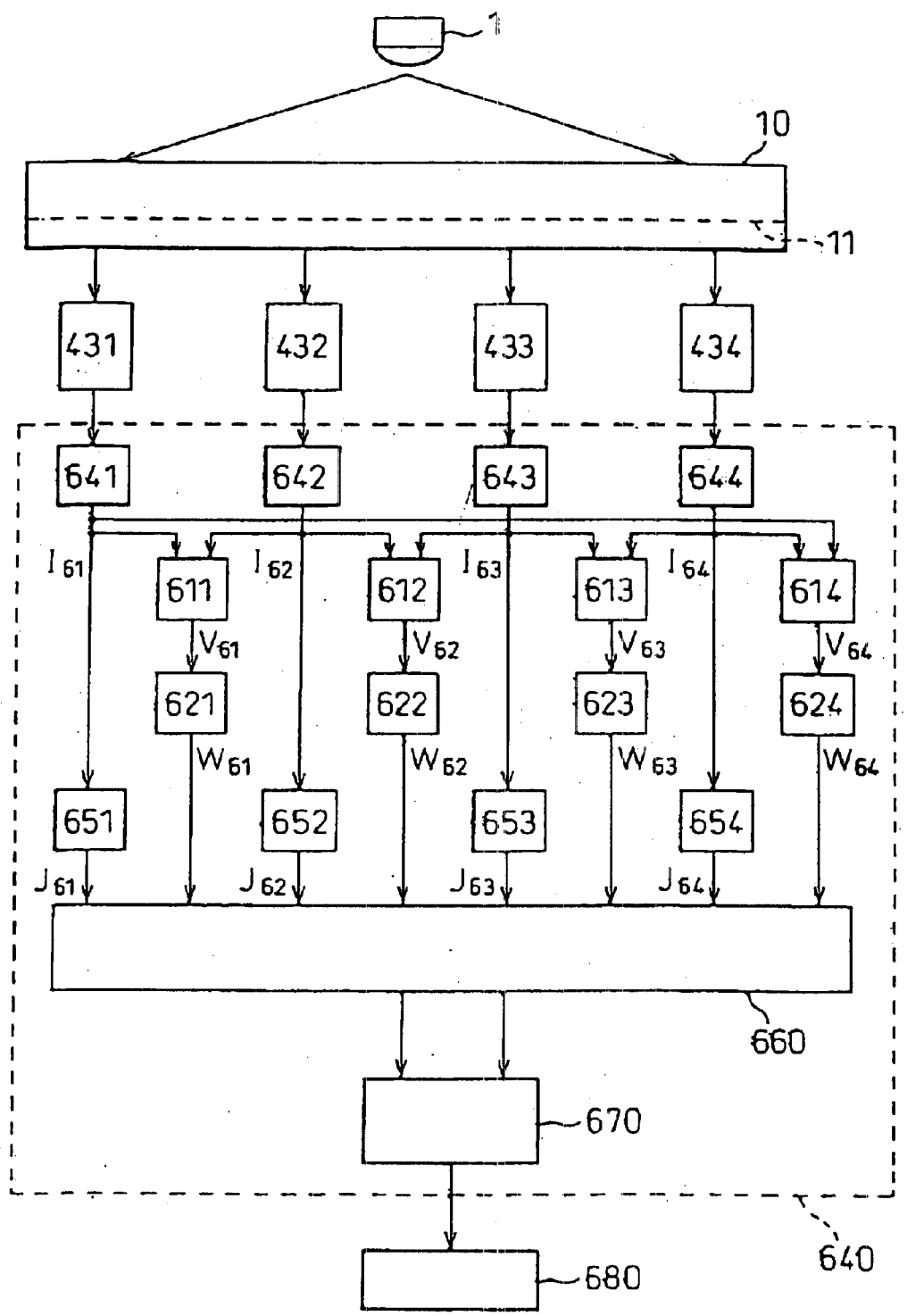
FIG. 19 is a block diagram showing signal flow according to a sixth embodiment.

FIG. 19 is a block diagram illustrating signal flow in the present embodiment. Reference numerals 641 to 644 are adders, which are connected to the respective light receiving arrays 431 to 434. Each adder adds together the outputs of all the light receiving elements in its associated light receiving array. In the present embodiment, since each light receiving array consists of one hundred light receiving elements 39, a 100-times output can be obtained. $I_{61}$ to $I_{64}$ denote the outputs of the respective adders 641 to 644.

Figure 20:
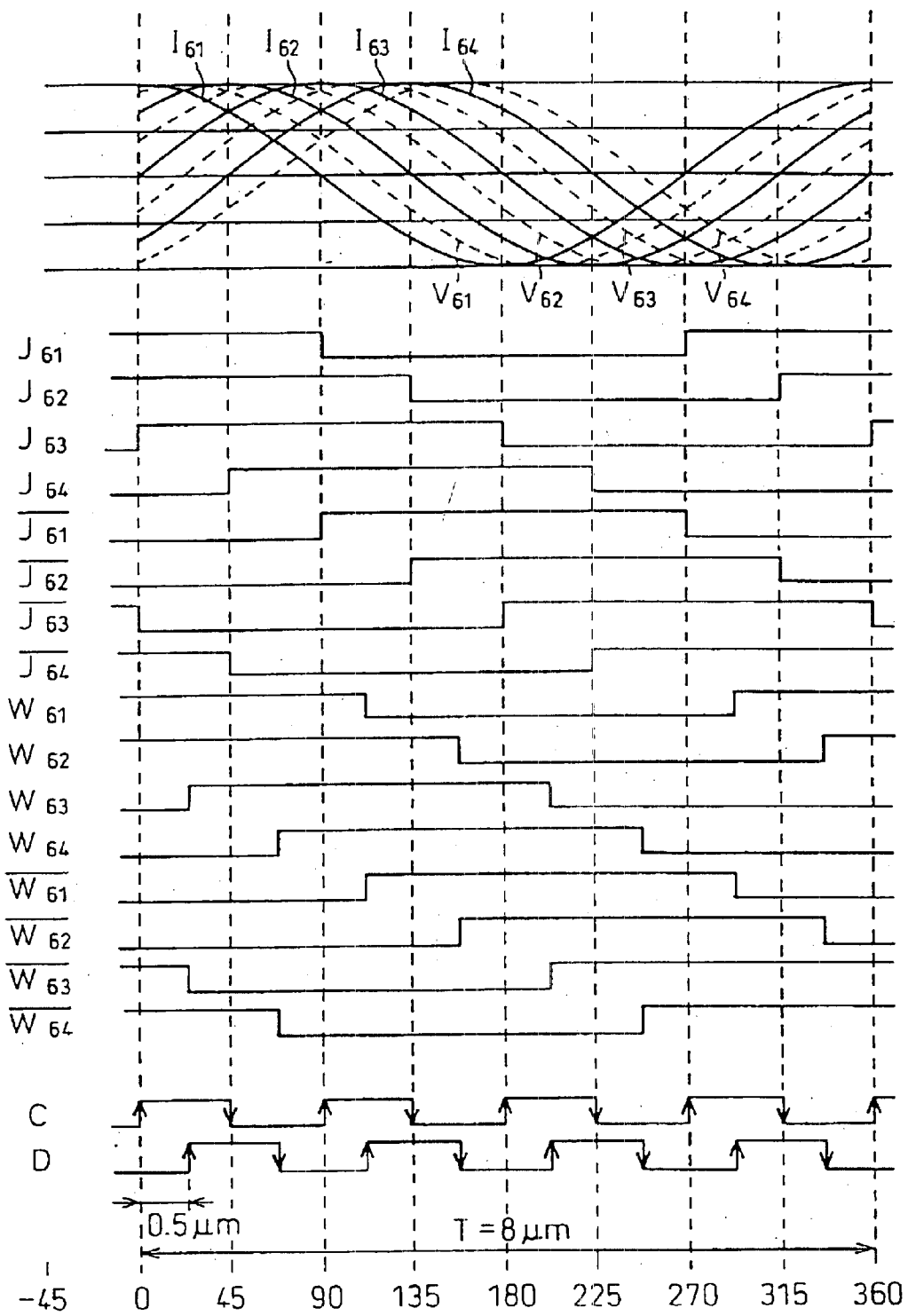
FIG. 20 is a diagram showing changes of signals obtained from light receiving elements according to the sixth embodiment.
Figure 21:
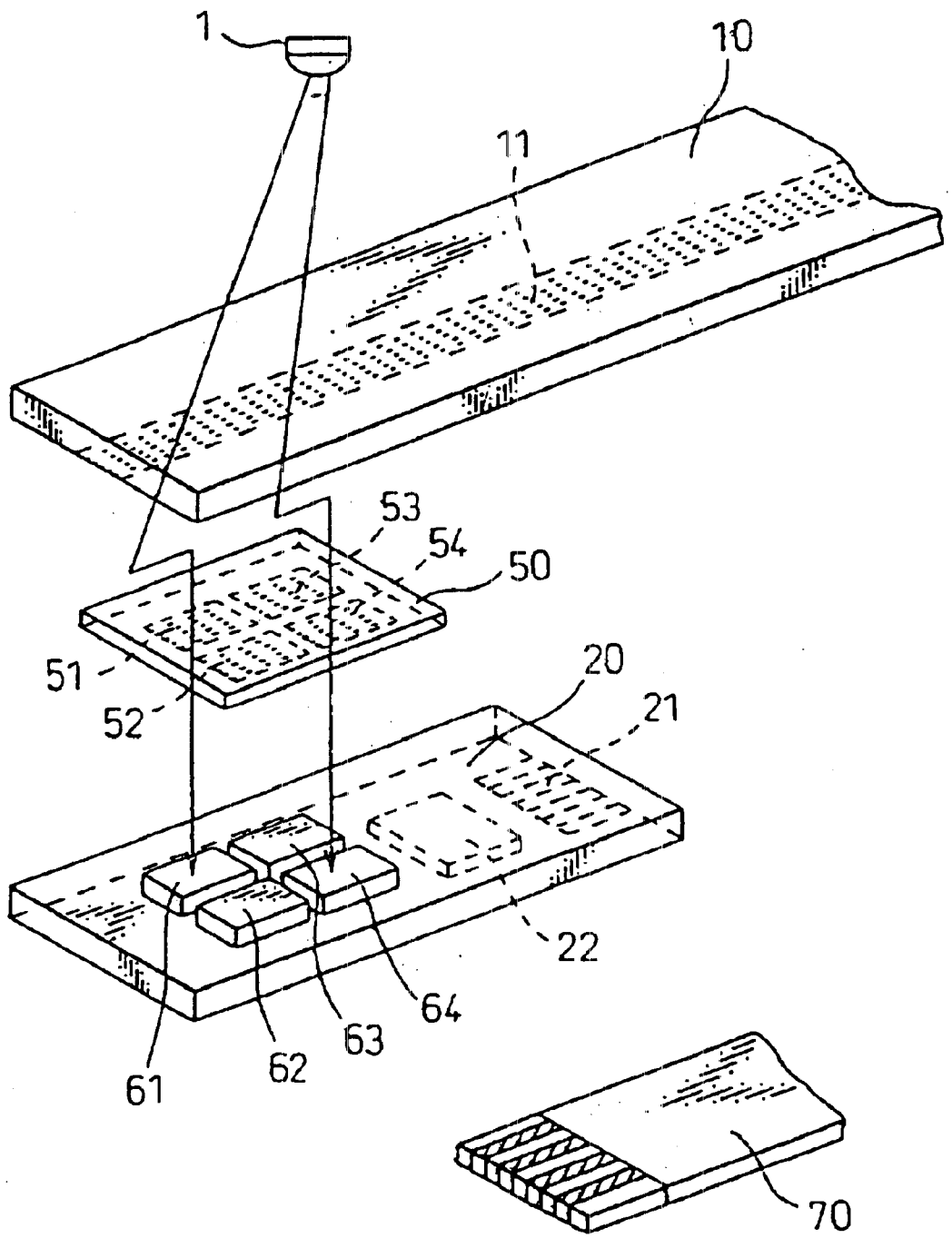
FIG. 21 is a diagram showing first prior art.
Figure 22:
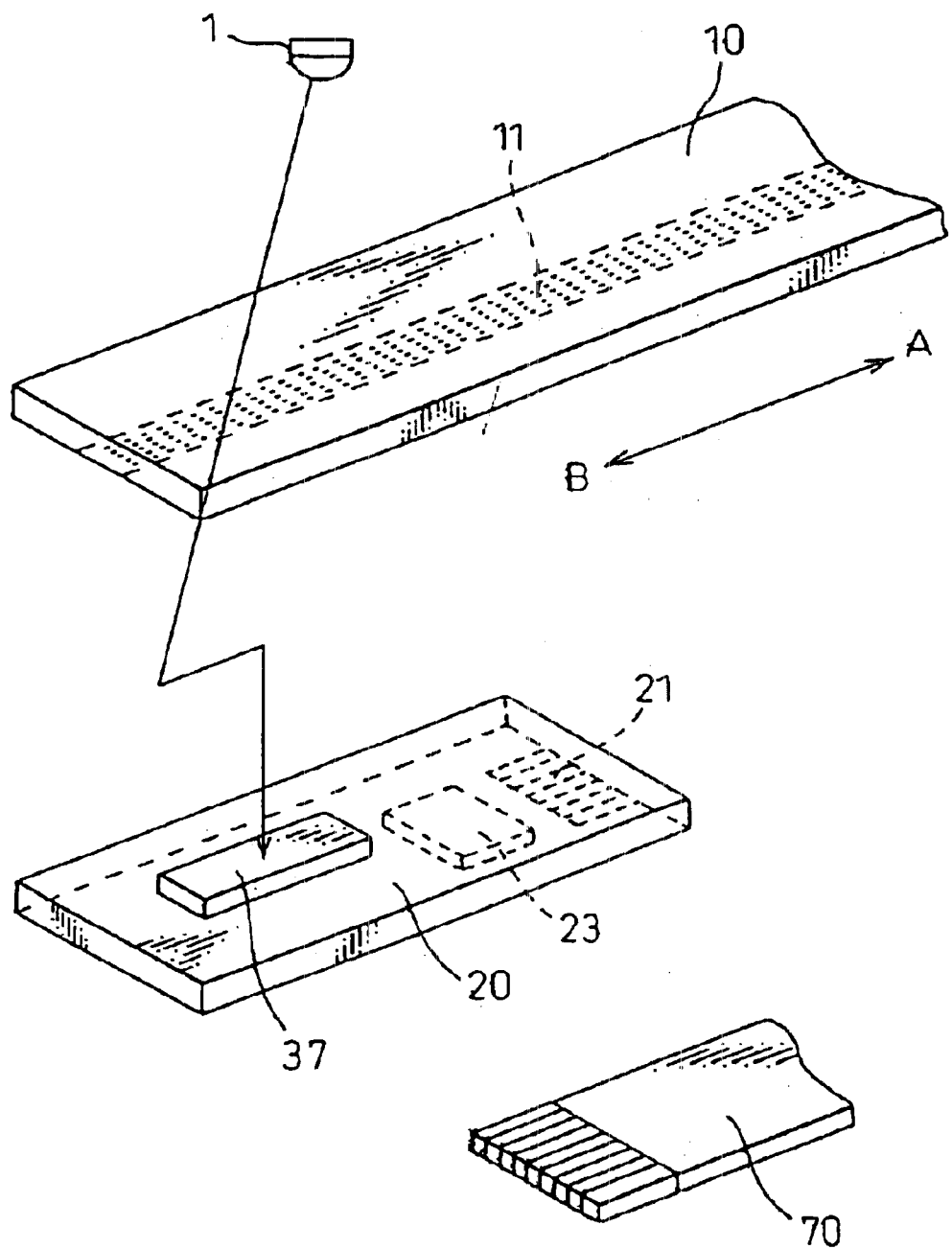
FIG. 22 is a diagram showing second prior art.
Figure 23:
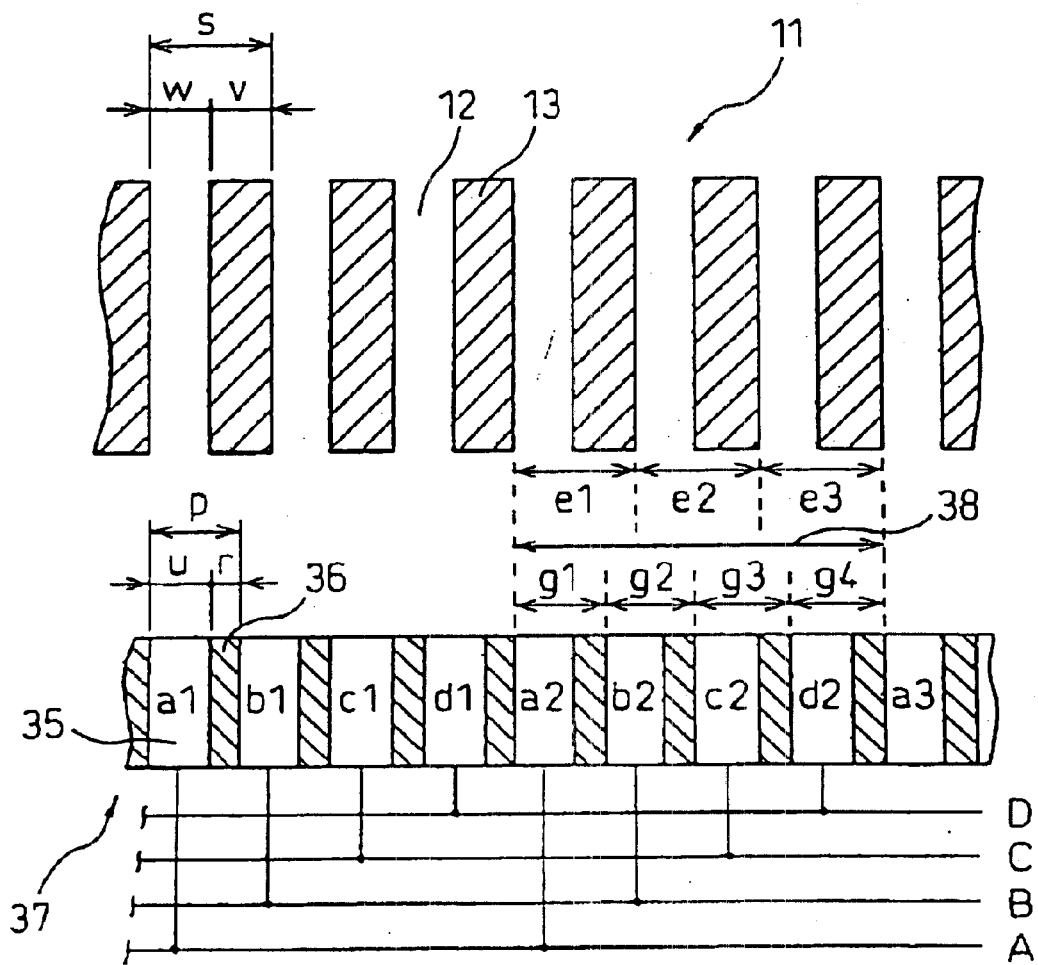
FIG. 23 is a diagram showing the relationship between an optical grid and a light receiving element array.

FIG. 20 illustrates, using solid lines, how the outputs $I_{61}$ to $I_{64}$ change when the glass scale 10 is moved in the direction of arrow A. First, the output $I_{61}$ of the light receiving array 431 will be explained. It is assumed here that the initial state of the output $I_{61}$ is given when the transparent portion 12 of the optical grid 11 is aligned with the light receiving portion 35 of the light receiving element array 431. In this initial state, therefore, the output $I_{61}$ takes a maximum value. The maximum value at this time is normalized to 1. As can be seen from FIG. 20, the output $I_{62}$ is shifted in phase by 45 degrees with respect to the output $I_{61}$. Likewise, the outputs $I_{63}$ and $I_{64}$ are shifted in phase by 45 degrees, respectively.

In FIG. 19, reference numerals 651 to 654 are comparators, which are connected to the respective adders 641 to 644. The comparators 641 to 654 convert the outputs $I_{61}$ to $I_{64}$ into digital signals $J_{61}$ to $J_{64}$ by using a threshold of 0.5. In FIG. 20, the digital signals $\overline{J_{61}}$ to $\overline{J_{64}}$ are shown along with digital signals $J_{61}$ to $J_{64}$. $\overline{J_{61}}$ to $\overline{J_{64}}$ are inverted versions of $J_{61}$ to $J_{64}$. The digital signals $\overline{J_{61}}$ to $\overline{J_{64}}$ are generated by a logic operation circuit 660 from the digital signals $J_{61}$ to $J_{64}$.

In FIG. 19, reference numerals 611 to 613 are analog adders. The analog adder 611 adds the outputs $I_{61}$ and $I_{62}$ and divides the sum by two to generate an output $V_{61}$. In the same manner, outputs $V_{62}$ and $V_{63}$ are generated by the analog adders 612 and 613, respectively. Reference numeral 614 in FIG. 19 is an analog subtractor. The analog subtractor 614 subtracts 161 from the output $I_{64}$ and divides the resulting difference by two to generate an output $V_{64}$. In FIG. 20, the thus generated outputs $V_{61}$ to $V_{64}$ are shown by dashed lines. As can be seen from FIG. 20, the output $V_{62}$ is shifted in phase by 45 degrees with respect to the output $V_{61}$. Likewise, the outputs $V_{63}$ and $V_{64}$ are shifted in phase by 45 degrees, respectively.

Reference numerals 621 to 624 in FIG. 19 are also comparators, which are connected to the respective analog adders 611 to 614. The comparators 621 to 624 convert the outputs $V_{61}$ to $V_{64}$ into digital signals $W_{61}$ to $W_{64}$ by using a threshold of 0.5. In FIG. 20, the digital signals $\overline{W_{61}}$ to $\overline{W_{64}}$ are shown along with digital signals $W_{61}$ to $W_{64}$. The digital signals $\overline{W_{61}}$ to $\overline{W_{64}}$ are inverted versions of $W_{61}$ to $W_{64}$. The digital signals $W_{61}$ to $W_{64}$ are generated by the logic operation 660 from the digital signals $W_{61}$ to $W_{64}$.

Here, signals C and D are defined as follows. The signals C and D are generated by the logic operation circuit 660 connected to the comparators 651 to 654 and 621 to 624.

$$C = J_{61} \cdot \overline{J_{62}} + J_{63} \cdot \overline{J_{64}} + J_{62} \cdot \overline{J_{61}} + J_{64} \cdot \overline{J_{63}} = J_{61} \oplus J_{62} + J_{63} \oplus J_{64}$$

$$D = W_{61} \cdot \overline{W_{62}} + W_{63} \cdot \overline{W_{64}} + W_{62} \cdot \overline{W_{61}} + W_{64} \cdot \overline{W_{63}} = W_{61} \oplus W_{62} + W_{63} \oplus W_{64}$$

Accordingly, an exclusive-OR circuit is used for the logic operation circuit 660, eliminating the need to generate inverted signals and thus simplifying the circuit.

The signals C and D are shown in FIG. 20. Since the pitch of the light receiving elements 39 in each light receiving array is 8 μm, the digital signals $J_{61}$ to $J_{64}$ each periodically vary with a cycle T=8 μm. Accordingly, the leading edge/trailing edge of the signals C and D occurs exactly at every 0.5 μm. Then, a counter 670 connected to the logic operation circuit 660 increments its count value by using the leading edge/trailing edge of the signals C and D as a trigger. This means that the counter 670 increments by 1 for every 0.5 μm movement of the glass scale. Thus, the same results as in the fifth embodiment can be obtained using the four light receiving arrays 431 to 434.

In the third to sixth embodiments, the pitch, s, of the optical grid 11 and the pitch, p, of the light receiving elements 39 are both 8 μm, and four or eight light receiving arrays are arranged so that one is shifted from another by s/8 (or p/8), to obtain a count value for every 0.5 or 1 μm. On the other hand, if s=p=12 μm, six or twelve light receiving arrays should be arranged so that one is shifted from another by s/12=1 μm; in this case also, a count value can be obtained for every 0.5 or 1 μm in the same manner as described above.

Also consider the case where the pitch, s, of the optical grid 11 and the pitch, p, of the light receiving elements are both 0.008 inch (0.2032 mm) and the light receiving arrays are arranged so that one is shifted from another by 0.001 inch (0.0254 mm); in this case, by employing a method similar to those used in the third to sixth embodiments, a count value can be obtained for every 0.0005 inch (0.0127 mm) or 0.001 inch (0.0254 mm).

In this way, by arranging the number, s or s/2, of light elements so that one is shifted from another by an amount equal to a minimum unit in accordance with the pitch of the optical grid, a count value can be obtained for the desired numeric value. In the third to sixth embodiments the light receiving arrays are arranged along a direction perpendicular to the direction of movement of the glass scale 10, but they may be arranged along a direction parallel to the direction of movement of the glass scale 10 as in the first embodiment.

What is claimed is:

1. An optical displacement measuring apparatus comprising:
    a moveable first member having an optical grid formed with a pitch s;
    a light source for illuminating said first member;
    a plurality of light receiving arrays, each having a plurality of light receiving elements arranged at said pitch s, for receiving light transmitted through said first member; and
    a computing circuit for measuring a displacement of said first member based on outputs from said plurality of light receiving arrays,
    wherein said plurality of light receiving arrays are arranged so that one is shifted from another by s/n (wherein n is an integer obtained by dividing 360 by the phase angle of an output to be measured) in a direction of movement of said first member.

2. The optical displacement measuring apparatus of claim 1, wherein
    said optical grid includes a transparent portion and an opaque portion, and the ratio of the width of said transparent portion to the width of said opaque portion is 1:1, and
    each of said light receiving elements includes a light receptive active portion and a light insensitive portion, and the ratio of the width of said light reception active portion to the width of said light reception non-active portion is 1:1.

3. The optical displacement measuring apparatus of claim 1, wherein said plurality of light receiving arrays are arranged along the direction of movement of said first member.

4. The optical displacement measuring apparatus of claim 1, wherein said plurality of light receiving arrays are arranged along a direction perpendicular to the direction of movement of said first member.

5. The optical displacement measuring apparatus of claim 1, wherein said s/n is equal to s/4.

6. The optical displacement measuring apparatus of claim 1, wherein s/n is 1 μm.

7. The optical displacement measuring apparatus of claim 1, wherein the number of light receiving arrays is n (wherein n is an integer obtained by dividing 360 by the phase angle of an output to be measured).

8. The optical displacement measuring apparatus of claim 1, wherein the number of said light receiving arrays is 4.

9. The optical displacement measuring apparatus of claim 1, wherein the number of said light receiving arrays is s or s/2.

10. The optical displacement measuring apparatus of claim 1, wherein said light source emits collimated light.

11. The optical displacement measuring apparatus of claim 1,
    wherein said computing circuit includes: an intra-pitch relative position computing unit which performs a phase calculation based on the output form said plurality of light receiving arrays, and computes a relative position within one pitch from said phase calculation; a direction discriminating computing unit which discriminates the direction of movement of said first member based on the outputs from said plurality of light receiving arrays; a counter which counts a number of clear bands of contrast occurring to the movement of said first member; and a relative position computing unit which measures said displacement of said first member based on said relative position computed by said intra-pitch relative position computing unit and on a count value of said counter.

12. The optical displacement measuring apparatus of claim 11, further comprising a display device for displaying said count value of said counter.

13. The optical displacement measuring apparatus of claim 1, wherein said computing circuit further includes a converter which converts the outputs from said plurality of light receiving arrays into digital signals, a generator for generating a count signal for counting the amount of said displacement of said first member based on said digital signals, and a counter which counts a leading edge or a trailing edge of said count signal.

14. The optical displacement measuring apparatus of claim 13, further comprising a display device for displaying the count value of said counter.

15. The optical displacement measuring apparatus of claim 13, wherein the count value of said counter corresponds a 1-$\mu$m displacement of said first member.

16. The optical displacement measuring apparatus of claim 13, wherein the count value of said counter corresponds a 0.5-$\mu$m displacement of said first member.

* * * * *